(12) United States Patent
Berezowski et al.

(10) Patent No.: US 10,743,064 B2
(45) Date of Patent: *Aug. 11, 2020

(54) SYSTEMS AND METHODS FOR IMPROVED AUDIENCE MEASURING

(71) Applicant: Rovi Guides, Inc., Santa Clara, CA (US)

(72) Inventors: David M. Berezowski, Tulsa, OK (US); Michael D. Ellis, Boulder, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,962

(22) Filed: Apr. 16, 2015

(65) Prior Publication Data

US 2015/0271550 A1 Sep. 24, 2015

Related U.S. Application Data

(63) Continuation of application No. 13/544,013, filed on Jul. 9, 2012, now Pat. No. 9,015,739, which is a
(Continued)

(51) Int. Cl.
*H04N 7/16* (2011.01)
*H04N 21/442* (2011.01)
(Continued)

(52) U.S. Cl.
CPC ....... *H04N 21/44222* (2013.01); *G06Q 30/02* (2013.01); *H04H 60/63* (2013.01); *H04H 60/65* (2013.01); *H04N 5/445* (2013.01); *H04N 5/76* (2013.01); *H04N 7/165* (2013.01); *H04N 7/17318* (2013.01); *H04N 7/17354* (2013.01); *H04N 21/252* (2013.01); *H04N 21/25883* (2013.01); *H04N 21/25891* (2013.01); *H04N 21/4147* (2013.01); *H04N 21/4312* (2013.01);
(Continued)

(58) Field of Classification Search
CPC ....... H04N 21/44222; H04N 21/25883; H04N 21/25891; H04N 21/4316
USPC ......... 725/14, 32, 35, 58, 110, 112
See application file for complete search history.

(56) References Cited

U.S. PATENT DOCUMENTS

| | | | |
|---|---|---|---|
| 4,107,735 | A | 8/1978 | Frohbach |
| 4,331,974 | A | 5/1982 | Cogswell et al. |

(Continued)

FOREIGN PATENT DOCUMENTS

| | | |
|---|---|---|
| CA | 2285645 | 7/1998 |
| CN | 1494321 A | 5/2004 |

(Continued)

OTHER PUBLICATIONS

"Television Viewing Habits of Three IQ Groups of Urban Middle School Students", Kunst, University of Pittsburgh, 1986, pp. 2-219 (54 pages).

(Continued)

*Primary Examiner* — Jivka A Rabovianski
(74) *Attorney, Agent, or Firm* — Haley Guiliano LLP

(57) ABSTRACT

Systems and methods for measuring audience information of programs are described. Systems and methods for providing audience information to users of interactive television applications are described.

18 Claims, 24 Drawing Sheets

Related U.S. Application Data continuation of application No. 09/823,705, filed on Mar. 30, 2001, now Pat. No. 8,578,403.

(60) Provisional application No. 60/193,952, filed on Mar. 31, 2000.

(51) Int. Cl.

| | | |
|---|---|---|
| *G06Q 30/02* | (2012.01) | |
| *H04H 60/63* | (2008.01) | |
| *H04H 60/65* | (2008.01) | |
| *H04N 5/445* | (2011.01) | |
| *H04N 5/76* | (2006.01) | |
| *H04N 7/173* | (2011.01) | |
| *H04N 21/25* | (2011.01) | |
| *H04N 21/4147* | (2011.01) | |
| *H04N 21/431* | (2011.01) | |
| *H04N 21/4722* | (2011.01) | |
| *H04N 21/488* | (2011.01) | |
| *H04N 21/658* | (2011.01) | |
| *H04N 21/81* | (2011.01) | |
| *H04N 21/258* | (2011.01) | |
| *H04N 21/472* | (2011.01) | |
| *H04N 21/61* | (2011.01) | |
| *H04H 20/38* | (2008.01) | |
| *H04H 60/31* | (2008.01) | |
| *H04N 5/765* | (2006.01) | |
| *H04N 5/775* | (2006.01) | |
| *H04N 5/85* | (2006.01) | |
| *H04N 9/804* | (2006.01) | |
| *H04N 21/47* | (2011.01) | |

(52) U.S. Cl.
CPC ..... *H04N 21/4314* (2013.01); *H04N 21/4316* (2013.01); *H04N 21/44204* (2013.01); *H04N 21/4722* (2013.01); *H04N 21/47214* (2013.01); *H04N 21/47217* (2013.01); *H04N 21/488* (2013.01); *H04N 21/6125* (2013.01); *H04N 21/6175* (2013.01); *H04N 21/6582* (2013.01); *H04N 21/812* (2013.01); *H04H 20/38* (2013.01); *H04H 60/31* (2013.01); *H04N 5/765* (2013.01); *H04N 5/775* (2013.01); *H04N 5/85* (2013.01); *H04N 9/8042* (2013.01); *H04N 21/47* (2013.01)

(56) References Cited

U.S. PATENT DOCUMENTS

| | | |
|---|---|---|
| 4,536,791 A | 8/1985 | Campbell et al. |
| 4,694,490 A | 9/1987 | Harvey et al. |
| 4,996,642 A | 2/1991 | Hey |
| 5,099,319 A | 3/1992 | Esch et al. |
| 5,151,789 A | 9/1992 | Young |
| 5,155,591 A | 10/1992 | Wachob |
| 5,212,553 A | 5/1993 | Maruoka |
| 5,223,924 A | 6/1993 | Strubbe |
| 5,227,874 A | 7/1993 | Von Kohorn |
| 5,253,066 A | 10/1993 | Vogel |
| 5,335,277 A | 8/1994 | Harvey et al. |
| 5,351,075 A | 9/1994 | Herz et al. |
| 5,353,121 A | 10/1994 | Young et al. |
| 5,357,276 A | 10/1994 | Banker et al. |
| 5,374,951 A | 12/1994 | Welsh |
| 5,382,970 A | 1/1995 | Kiefl |
| 5,410,344 A | 4/1995 | Graves et al. |
| 5,446,919 A | 8/1995 | Wilkins |
| 5,452,012 A | 9/1995 | Saitoh |
| 5,485,197 A | 1/1996 | Hoarty |
| 5,488,409 A | 1/1996 | Yuen et al. |
| 5,502,504 A | 3/1996 | Marshall et al. |
| 5,515,098 A | 5/1996 | Caries |
| 5,534,911 A | 7/1996 | Levitan |
| 5,539,822 A | 7/1996 | Lett |
| 5,548,345 A | 8/1996 | Brian |
| 5,557,721 A | 9/1996 | Fite et al. |
| 5,559,548 A | 9/1996 | Davis et al. |
| 5,559,549 A | 9/1996 | Hendricks et al. |
| 5,559,550 A | 9/1996 | Mankovitz |
| 5,572,442 A | 11/1996 | Schulhof et al. |
| 5,574,962 A | 11/1996 | Fardeau et al. |
| 5,583,560 A | 12/1996 | Florin et al. |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,600,364 A | 2/1997 | Hendricks et al. |
| 5,610,653 A | 3/1997 | Abecassis |
| 5,621,456 A | 4/1997 | Florin et al. |
| 5,623,613 A | 4/1997 | Rowe et al. |
| 5,629,733 A | 5/1997 | Youman et al. |
| 5,635,978 A | 6/1997 | Alten et al. |
| 5,635,979 A | 6/1997 | Kostreski et al. |
| 5,636,346 A | 6/1997 | Saxe |
| 5,657,072 A | 8/1997 | Aristedes et al. |
| 5,657,091 A | 8/1997 | Bertram |
| 5,659,350 A | 8/1997 | Hendricks et al. |
| 5,663,757 A | 9/1997 | Morales |
| 5,666,293 A | 9/1997 | Metz |
| 5,666,645 A | 9/1997 | Thomas et al. |
| 5,677,708 A | 10/1997 | Matthews, III et al. |
| 5,682,195 A | 10/1997 | Hendricks et al. |
| 5,686,954 A | 11/1997 | Yoshinobu et al. |
| 5,687,331 A | 11/1997 | Volk et al. |
| 5,724,521 A | 3/1998 | Dedrick |
| 5,734,853 A | 3/1998 | Hendricks et al. |
| 5,740,549 A | 4/1998 | Reilly et al. |
| 5,749,043 A | 5/1998 | Worthy |
| 5,754,939 A | 5/1998 | Herz et al. |
| 5,758,257 A | 5/1998 | Herz et al. |
| 5,760,821 A | 6/1998 | Ellis et al. |
| 5,774,170 A | 6/1998 | Hite et al. |
| 5,781,246 A | 7/1998 | Alten et al. |
| 5,790,426 A | 8/1998 | Robinson |
| 5,793,409 A | 8/1998 | Tetsumura |
| 5,796,952 A | 8/1998 | Davis et al. |
| 5,798,785 A | 8/1998 | Hendricks |
| 5,801,747 A | 9/1998 | Bedard |
| 5,801,785 A | 9/1998 | Crump et al. |
| 5,805,154 A | 9/1998 | Brown |
| 5,808,694 A | 9/1998 | Usui et al. |
| 5,819,156 A | 10/1998 | Belmont |
| 5,822,123 A | 10/1998 | Davis et al. |
| 5,828,420 A | 10/1998 | Marshall et al. |
| 5,828,839 A | 10/1998 | Moncreiff |
| 5,830,068 A | 11/1998 | Brenner et al. |
| 5,838,314 A | 11/1998 | Neel et al. |
| 5,842,010 A | 11/1998 | Jain et al. |
| 5,842,199 A | 11/1998 | Miller et al. |
| 5,844,620 A | 12/1998 | Coleman et al. |
| 5,848,396 A | 12/1998 | Gerace |
| 5,850,218 A | 12/1998 | Lajoie et al. |
| 5,867,226 A | 2/1999 | Wehmeyer et al. |
| 5,872,588 A | 2/1999 | Aras et al. |
| 5,886,691 A | 3/1999 | Furuya et al. |
| 5,886,731 A | 3/1999 | Ebisawa |
| 5,900,905 A | 5/1999 | Shoff et al. |
| 5,907,323 A | 5/1999 | Lawler et al. |
| 5,918,014 A | 6/1999 | Robinson |
| 5,940,073 A | 8/1999 | Klosterman et al. |
| 5,945,988 A | 8/1999 | Williams et al. |
| 5,951,642 A | 9/1999 | Onoe et al. |
| 5,956,716 A | 9/1999 | Kenner et al. |
| 5,974,222 A | 10/1999 | Yuen et al. |
| 5,977,964 A | 11/1999 | Williams et al. |
| 5,990,927 A | 11/1999 | Hendricks et al. |
| 5,999,698 A | 12/1999 | Nakai et al. |
| 6,002,393 A | 12/1999 | Hite et al. |
| 6,002,394 A | 12/1999 | Schein et al. |

(56) References Cited

U.S. PATENT DOCUMENTS

| | | | |
|---|---|---|---|
| 6,005,597 A | 12/1999 | Barrett et al. |
| 6,006,257 A | 12/1999 | Slezak |
| 6,008,836 A | 12/1999 | Bruck |
| 6,014,502 A | 1/2000 | Moraes |
| 6,018,372 A | 1/2000 | Etheredge |
| 6,020,929 A | 2/2000 | Marshall et al. |
| 6,025,837 A | 2/2000 | Matthews, III et al. |
| 6,025,886 A | 2/2000 | Koda |
| 6,029,045 A | 2/2000 | Picco et al. |
| 6,047,317 A | 4/2000 | Bbisdkian et al. |
| 6,052,145 A | 4/2000 | Macrae et al. |
| 6,061,082 A | 5/2000 | Park |
| 6,061,097 A | 5/2000 | Satterfield |
| 6,064,376 A | 5/2000 | Berezowski et al. |
| 6,064,980 A | 5/2000 | Jacobi et al. |
| 6,078,348 A | 6/2000 | Klosterman et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,122,011 A | 9/2000 | Dias |
| 6,133,909 A | 10/2000 | Schein et al. |
| 6,144,702 A | 11/2000 | Yurt et al. |
| 6,151,059 A | 11/2000 | Schein et al. |
| 6,157,413 A | 12/2000 | Hanafee et al. |
| 6,160,570 A | 12/2000 | Sitnik |
| 6,163,316 A | 12/2000 | Killian |
| 6,172,677 B1 | 1/2001 | Stautner et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,202,062 B1 | 3/2001 | Cameron et al. |
| 6,240,555 B1 | 5/2001 | Shoff et al. |
| 6,256,785 B1 | 7/2001 | Klappert et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,279,157 B1 | 8/2001 | Takasu |
| 6,286,005 B1 * | 9/2001 | Cannon | G06Q 30/02 |
| | | | 455/2.01 |
| 6,286,140 B1 | 9/2001 | Ivanyi |
| 6,298,482 B1 | 10/2001 | Seidman et al. |
| 6,312,336 B1 | 11/2001 | Handelman et al. |
| 6,321,991 B1 | 11/2001 | Knowles |
| 6,323,911 B1 | 11/2001 | Schein et al. |
| 6,330,586 B1 | 12/2001 | Yates et al. |
| 6,331,877 B1 | 12/2001 | Bennington et al. |
| 6,343,311 B1 | 1/2002 | Nishida et al. |
| 6,353,929 B1 | 3/2002 | Houston |
| 6,359,661 B1 | 3/2002 | Nickum |
| 6,363,525 B1 | 3/2002 | Dougherty et al. |
| 6,366,890 B1 | 4/2002 | Usrey |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,405,370 B1 | 6/2002 | Jarrell |
| 6,405,926 B1 | 6/2002 | Yomogida et al. |
| 6,408,437 B1 | 6/2002 | Hendricks et al. |
| 6,412,110 B1 | 6/2002 | Schein et al. |
| 6,418,556 B1 | 7/2002 | Bennington et al. |
| 6,445,306 B1 | 9/2002 | Trovato et al. |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,705 B1 | 11/2002 | Yuen et al. |
| 6,502,241 B1 | 12/2002 | Kretz et al. |
| 6,515,680 B1 | 2/2003 | Hendricks et al. |
| 6,516,323 B1 | 2/2003 | Kamba |
| 6,530,082 B1 | 3/2003 | Del Sesto et al. |
| 6,539,548 B1 | 3/2003 | Hendricks et al. |
| 6,545,722 B1 | 4/2003 | Schultheiss et al. |
| 6,564,378 B1 | 5/2003 | Satterfield et al. |
| 6,587,127 B1 | 7/2003 | Leeke et al. |
| 6,622,306 B1 | 9/2003 | Kamada |
| 6,637,029 B1 | 10/2003 | Maissel et al. |
| 6,698,020 B1 | 2/2004 | Zigmond et al. |
| 6,704,931 B1 | 3/2004 | Schaffer et al. |
| 6,738,978 B1 | 5/2004 | Hendricks et al. |
| 6,750,881 B1 | 6/2004 | Appelman |
| 6,750,885 B1 | 6/2004 | Finch, II et al. |
| 6,757,691 B1 | 6/2004 | Welsh et al. |
| 6,766,956 B1 | 7/2004 | Boylan, III et al. |
| 6,792,618 B1 | 9/2004 | Bendinelli et al. |
| 6,983,478 B1 | 1/2006 | Grauch et al. |
| 6,999,698 B2 | 2/2006 | Yamauchi |
| 7,003,792 B1 | 2/2006 | Yuen |
| 7,047,550 B1 | 5/2006 | Kamen |
| 7,096,486 B1 * | 8/2006 | Ukai | H04N 5/44543 |
| | | | 348/E5.105 |
| 7,117,518 B1 | 10/2006 | Takahashi et al. |
| 7,188,356 B1 | 3/2007 | Cezeaux et al. |
| 7,200,852 B1 | 4/2007 | Block |
| 7,343,614 B1 | 3/2008 | Hendricks et al. |
| 7,356,547 B2 | 4/2008 | Ozer et al. |
| 7,478,414 B1 | 1/2009 | Glusker et al. |
| 7,813,822 B1 | 10/2010 | Hoffberg |
| 9,015,739 B2 | 4/2015 | Berezowski et al. |
| 2001/0021994 A1 | 9/2001 | Nash |
| 2002/0010930 A1 | 1/2002 | Shah-Nazaroff et al. |
| 2002/0056087 A1 | 5/2002 | Berezowski et al. |
| 2002/0059602 A1 | 5/2002 | Macrae et al. |
| 2002/0095676 A1 | 7/2002 | Knee et al. |
| 2002/0112239 A1 | 8/2002 | Goldman |
| 2002/0178232 A1 | 11/2002 | Ferguson |
| 2002/0188746 A1 * | 12/2002 | Drosset | H04H 20/02 |
| | | | 709/231 |
| 2003/0010454 A1 | 1/2003 | Bailey, III et al. |
| 2003/0110171 A1 | 6/2003 | Ozer et al. |
| 2003/0131355 A1 | 7/2003 | Berenson et al. |
| 2003/0146940 A1 | 8/2003 | Ellis et al. |
| 2004/0003397 A1 | 1/2004 | Boston et al. |
| 2004/0022278 A1 | 2/2004 | Thomas et al. |
| 2004/0049788 A1 | 3/2004 | Mori et al. |
| 2004/0194138 A1 | 9/2004 | Boylan, III et al. |
| 2004/0243470 A1 | 12/2004 | Ozer et al. |
| 2005/0020439 A1 | 1/2005 | Ishii et al. |
| 2005/0204379 A1 | 3/2005 | Yamamori |
| 2005/0076363 A1 | 4/2005 | Dukes |
| 2005/0235318 A1 | 6/2005 | Grauch et al. |
| 2005/0149964 A1 | 7/2005 | Thomas et al. |
| 2005/0160452 A1 | 7/2005 | Lawler et al. |
| 2005/0251824 A1 | 11/2005 | Thomas et al. |
| 2005/0278741 A1 | 12/2005 | Robarts et al. |
| 2006/0031916 A1 | 2/2006 | Colter et al. |
| 2006/0174277 A1 | 8/2006 | Sezan et al. |
| 2006/0190966 A1 | 8/2006 | Mckissick et al. |
| 2006/0218587 A1 | 9/2006 | Kelts |
| 2006/0248558 A1 | 11/2006 | Barton et al. |
| 2007/0113244 A1 | 5/2007 | Verschueren |
| 2007/0136753 A1 | 6/2007 | Bovenschulte et al. |
| 2008/0109284 A1 | 5/2008 | Slaney et al. |
| 2008/0196053 A1 | 8/2008 | Thomas et al. |
| 2008/0235725 A1 | 9/2008 | Hendricks |
| 2009/0254962 A1 | 10/2009 | Hendricks et al. |
| 2010/0122282 A1 | 5/2010 | DuBose |
| 2010/0175081 A1 | 7/2010 | Boylan, III et al. |
| 2010/0192172 A1 | 7/2010 | Thomas et al. |
| 2010/0274666 A1 | 10/2010 | Wilf et al. |
| 2011/0078628 A1 | 3/2011 | Rosenberg et al. |

FOREIGN PATENT DOCUMENTS

| | | | |
|---|---|---|---|
| EP | 0424648 | | 5/1991 |
| EP | 0711076 | | 5/1996 |
| EP | 0753964 | A1 | 1/1997 |
| EP | 0772360 | | 5/1997 |
| EP | 0784405 | | 7/1997 |
| EP | 0822718 | | 2/1998 |
| EP | 0849948 | | 6/1998 |
| EP | 0851681 | | 7/1998 |
| EP | 1961228 | | 3/2011 |
| FR | 2780225 | A1 | 12/1999 |

(56) References Cited

FOREIGN PATENT DOCUMENTS

| | | |
|---|---|---|
| JP | 59141878 | 8/1984 |
| JP | 61050470 | 3/1986 |
| JP | 63-84396 | 4/1988 |
| JP | 01-177782 | 7/1989 |
| JP | 01177782 A | 7/1989 |
| JP | 0479053 | 3/1992 |
| JP | 06-124309 | 5/1994 |
| JP | 723356 | 4/1995 |
| JP | 8331546 | 12/1996 |
| JP | 9261609 | 10/1997 |
| JP | 10-013774 | 1/1998 |
| JP | H1013774 A | 1/1998 |
| JP | 10-93933 | 4/1998 |
| JP | H10162028 A | 6/1998 |
| JP | 1125541 | 1/1999 |
| WO | WO 1994014284 | 6/1994 |
| WO | WO 19940014281 | 6/1994 |
| WO | WO 1994023383 | 10/1994 |
| WO | WO 1995007003 | 3/1995 |
| WO | WO 1995015658 | 6/1995 |
| WO | WO 1995032585 | 11/1995 |
| WO | WO 1996008109 | 3/1996 |
| WO | WO 1996008113 | 3/1996 |
| WO | WO 1996009721 | 3/1996 |
| WO | WO-1996026605 A1 | 8/1996 |
| WO | WO 1996034491 | 10/1996 |
| WO | WO-1996/041478 A1 | 12/1996 |
| WO | WO 1996041471 | 12/1996 |
| WO | WO 1997007656 | 3/1997 |
| WO | WO 1997012486 | 4/1997 |
| WO | WO 1997013368 | 4/1997 |
| WO | WO 1997017774 | 5/1997 |
| WO | WO 1997018675 | 5/1997 |
| WO | WO 1997026612 | 7/1997 |
| WO | WO 1997031480 | 8/1997 |
| WO | WO 1997041673 | 11/1997 |
| WO | WO 1997042763 | 11/1997 |
| WO | WO 1997048230 | 12/1997 |
| WO | WO 1997049237 | 12/1997 |
| WO | WO 1997049242 | 12/1997 |
| WO | WO 1998006219 | 2/1998 |
| WO | WO 1998017064 | 4/1998 |
| WO | WO 1998026584 | 6/1998 |
| WO | WO 1998027723 | 6/1998 |
| WO | WO 1998028906 | 7/1998 |
| WO | WO 1998040120 | 9/1998 |
| WO | WO 1998041020 | 9/1998 |
| WO | WO 1998056172 | 12/1998 |
| WO | WO 1999001984 | 1/1999 |
| WO | WO 1999004561 | 1/1999 |
| WO | WO 1999007142 | 2/1999 |
| WO | WO 1999012346 | 3/1999 |
| WO | WO 1999029109 | 6/1999 |
| WO | WO 1999045700 | 9/1999 |
| WO | WO 1999045702 | 9/1999 |
| WO | WO 1999052285 | 10/1999 |
| WO | WO 1999055091 | 10/1999 |
| WO | WO 1999059275 | 11/1999 |
| WO | WO 1999060789 | 11/1999 |
| WO | WO 1999060790 | 11/1999 |
| WO | WO 1999066725 | 12/1999 |
| WO | WO 1999066726 | 12/1999 |
| WO | WO 2000004706 | 1/2000 |
| WO | WO 2000004709 | 1/2000 |
| WO | WO 2000016548 | 3/2000 |
| WO | WO 2000022761 | 4/2000 |
| WO | WO 2000027122 | 5/2000 |
| WO | WO 2000027124 | 5/2000 |
| WO | WO 2000028734 | 5/2000 |
| WO | WO 2000033160 | 6/2000 |
| WO | WO 2000033224 | 6/2000 |
| WO | WO 2000049801 | 8/2000 |
| WO | WO 2000078050 | 12/2000 |
| WO | WO 2001001308 | 1/2001 |
| WO | WO 2001076248 | 10/2001 |
| WO | WO 2001089213 | 11/2001 |
| WO | WO 2002025938 | 3/2002 |
| WO | WO 2002031731 | 4/2002 |
| WO | WO 2003036970 | 5/2003 |
| WO | WO 2003051051 | 6/2003 |
| WO | WO 2007070422 | 6/2007 |

OTHER PUBLICATIONS

Cue Readers, Digital: Convergence Corporation, at http://www.crq.com/rnaster templ.cfm?view=products&products=cuereader (printed Sep. 24, 2001).
GoCode, the Code Corporate at http://www.gocode.com/products/reader.htm (printed Sep. 24, 2001).
Paperclick, NeoMedia Technologies, Inc., at http://www.paperclick.com/Howworks,htm (printed Sep. 24, 2001).
Video Plus+, Gemstar Development Limited, at http://www.gernstarco.ukien/videoplus/intromain.html (printed Sep. 24, 2001).

* cited by examiner

SYSTEMS AND METHODS FOR IMPROVED AUDIENCE MEASURING

CROSS-REFERENCE TO RELATED APPLICATION

This application is a continuation of prior U.S. patent application Ser. No. 13/544,013, filed Jul. 9, 2012, which is a continuation of U.S. patent application Ser. No. 09/823,705, filed Mar. 30, 2001, which claims priority benefit under 35 U.S.C. § 119(e) from U.S. provisional application No. 60/193,952, filed Mar. 31, 2000. The aforementioned, earlier-filed applications are hereby incorporated by reference herein in their entireties.

BACKGROUND OF THE INVENTION

The present invention relates to television audience measuring systems and, more particularly, to audience measuring systems for personal video recording systems.

Video and audio media, such as television programs, pay-per-view programs, near-video-on-demand (NVOD) programs, video-on-demand (VOD) programs, music, promotional material, or other types of media, are typically distributed to viewers over wired and wireless networks. Currently, audience measuring systems measure the audience sizes based only on the media that is being watched or recorded as it is broadcast.

However, viewers and listeners of such media typically record such media on videocassettes, audiocassettes, and other storage media. More recently, products have been developed that allow users to manage their viewing experiences and record media with unprecedented flexibility. Personal video recorders (PVRs), such as those provided by TIVO™ and REPLAY™, record programs on hard-disk drives or other digital storage devices. Users can schedule programs for recording and play them back at a later time. These systems also record what users are watching in real-time, allowing the users to pause real-time programs when, for example, the user must leave the room. Users may resume their viewing upon returning, where they left off, and may even fast forward through commercials until they reach the point at which the program is currently provided. Users may also rewind programs. User may also watch or listen to some media while simultaneously recording another.

With the advent of these and other new technologies, traditional methods for audience measuring are no longer optimal for measuring audience sizes because they measure the audience size for only what is watched or recorded as it is broadcast. Such approaches do not account for future viewings of programs from personal recordings. In addition, it may be desirable to provide audience measurements to users to guide them in selecting media.

It is therefore an object of the present invention to provide systems and methods for measuring audience sizes and for providing audience size information to users.

SUMMARY OF THE INVENTION

This and other objects of the invention are accomplished in accordance with the principles of the present invention by measuring audience size and providing audience size information to users. Various embodiments and features of the present invention are described, for example, in U.S. provisional patent Application No. 60/193,952, filed Mar. 31, 1999, which is hereby incorporated by reference herein in its entirety.

Some embodiments of the present invention may present users with audience information for programs to indicate the popularity of the media. Programs may include television programs, pay-per-view (PPV) programs, near-video-on-demand (NVOD) programs, video-on-demand (VOD) programs, music, advertisements, promotional materials, any other video or audio media, or any suitable combination thereof. Audience information may include, for example, ratings, the audience size or the audience share for a particular program, the market share of a particular program, or any other suitable information. Audience information may be obtained by conventional means or in response to the playback or recording of media.

Some embodiments of the present invention may overlay audience information onto a display, such as the program the user is watching, an application display, or other suitable display. Audience information may be displayed when, for example, a user selects a media listing from a guidance application, as the user browses through program listings, or may be displayed when a user selects recorded media for playback. Audience information may, for example, present to the user the audience size of a program that is currently being viewed, recorded, or a combination thereof, in real time. Audience information may be presented using any suitable passive or interactive text, graphics, animations, video, audio, a suitable combination thereof, or any other suitable content. In some embodiments, audience information may be displayed for a predefined period of time when the user first access the display, and then the audience information may disappear (e.g., fade away). Some embodiments of the present invention may provide audience information only in response to the user's request. In some embodiments, audience information may be played over audio media.

Some embodiments of the present invention may track advertisements (e.g., commercials or any other promotional material) to determine the appeal of the advertisements to users, and may provide advertisement audience information. Advertisement audience information may include, for example, advertisement ratings, the audience size for the advertisement, the market share of the advertisement, or any other suitable information related to advertising or their audiences. Advertisement audience information may be overlaid onto the advertisement, may be displayed when a user selects the advertisement, may be displayed as the user browses through advertisements, may be displayed when a user selects recorded media for playback, or using any other suitable approach. Advertisement audience information may be provided using any suitable passive or interactive text, graphics, animations, video, audio, a suitable combination thereof, or any other suitable content.

In some embodiments of the present invention, audience measuring and providing audience information to users may be performed by an interactive television application, such as an interactive television program guide or other suitable guidance application. In some embodiments of the present invention, displays may, for example, provide users with opportunities to browse media listings for programs (current or recorded) and provide users with audience measurements.

Audience information may be distributed to the user's equipment using any suitable approach. Audience information may be distributed, for example, automatically for all or a subset of media as the media is distributed. Audience information may be provided with media (e.g., in the vertical blanking interval (VBI) or in a digital field), or separate from the media. In some embodiments, audience information may be requested from a server as it is needed for display.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, in which.

DETAILED DESCRIPTION OF THE INVENTION

The interactive television application of the present invention may be based on a number of different hardware platforms. Suitable hardware that may be used in implementing the program guide includes hardware such as satellite receivers, personal computer televisions (PC/TVS), personal computers (e.g., with television tuner cards), cable set-top boxes, or any other suitable hardware. In some embodiments, the interactive television application may be an audience measurement application which may measure audience information or provide audience information. In some embodiments, the interactive television application may be an interactive television program guide. Illustrative interactive television program guide systems are described, for example, in Knee et al. U.S. Pat. No. 5,589,892 and Knudson et al. U.S. patent application Ser. No. 09/357,941, filed Jul. 16, 1999, which are hereby incorporated by reference herein in their entireties. Client-server program guide systems are described, for example, in Ellis et al. U.S. patent application Ser. No. 09/374,043, filed Aug. 13, 1999, which is hereby incorporated by reference herein in its entirety. On-line program guide systems are described, for example, in Boyer et al. U.S. patent application Ser. No. 08/938,028, filed Sep. 18, 1997, which is hereby incorporated by reference herein in its entirety.

The interactive program guide or other interactive television application may allow users to record programs on digital or analog storage devices (e.g., videocassettes, hard disks, floppy discs, flash memory, recordable compact discs (CDS), recordable digital versatile discs (DVDs), or any other type of storage). Interactive program guides having digital storage are described, for example, in Hassell et al. U.S. patent application Ser. No. 09/157,256, filed Sep. 17, 1998, which is hereby incorporated by reference herein in its entirety. Recording of media can also be performed by a program guide or other server. Client-server based program guides with remote server recording are described, for example, in Ellis et al. U.S. patent application Ser. No. 09/332,244, filed Jun. 11, 1999, which is hereby incorporated by reference herein in its entirety. On-line program guides may also record programs or direct a user's equipment to record programs.

Figure 1:
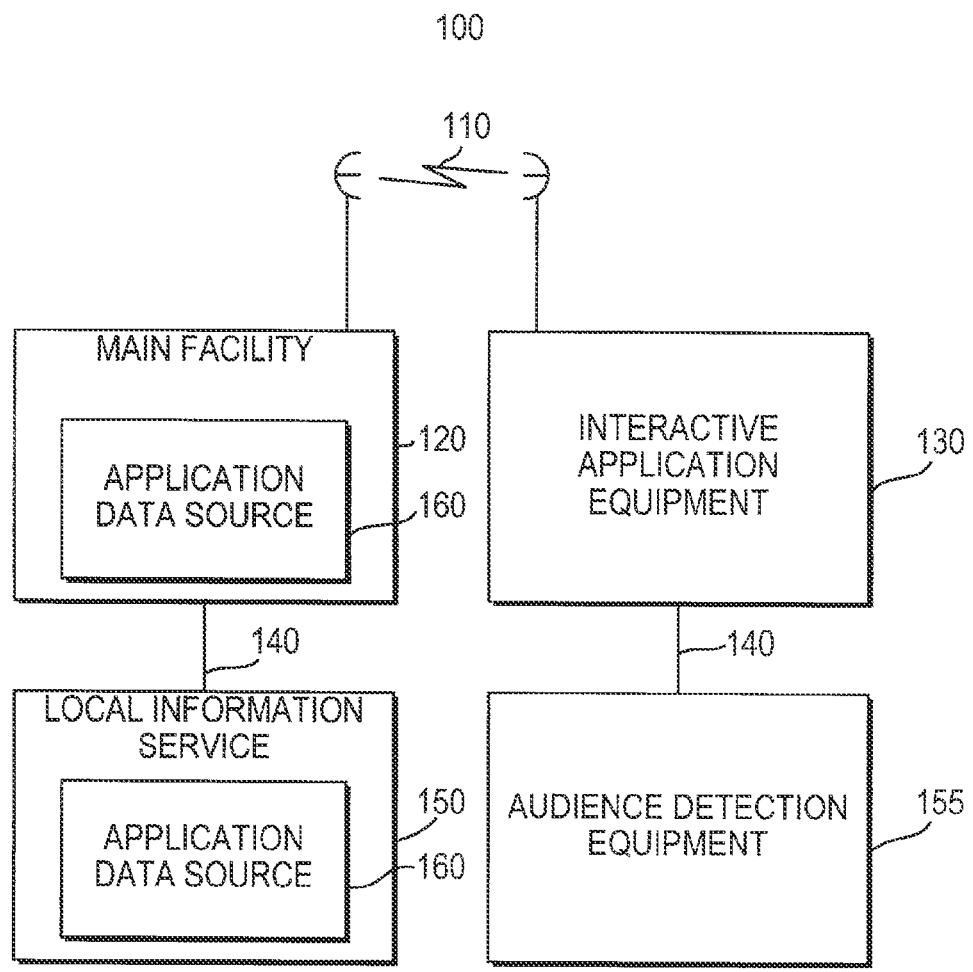
FIG. 1 is a schematic block diagram of an illustrative system, in accordance with one embodiment of the present invention.

An illustrative system 100 in accordance with one embodiment of the present invention is shown in FIG. 1. Main facility 120 provides application data from application data source 160 to interactive application equipment 130 via communications link 110. There may be multiple application data sources but only one has been shown to avoid over-complicating the drawing. If desired, application data sources may be located at facilities separate from main facility 120, such as at local information service 150, and have their data provided to main facility 120 for localization and distribution. Application data source 160 may be any suitable computer or computer based system for obtaining data (e.g., manually from an operator, electronically via a computer network or other connection, or via storage media) and putting the data into electronic form for distribution by main facility 120. Link 110 may be a satellite link, a telephone network link, a cable or fiber optic link, a microwave link, an Internet link, a combination of such links, or any other suitable communications link. Video signals may also be transmitted over link 110 if desired.

Local information service 150 may be any suitable facility for obtaining data particular to a localized region and providing the data to main facility 120 over communications link 140. Local information service 150 may be, for example, a local weather station that measures weather data, a local newspaper that obtains local high school and college sporting information, or any other suitable provider of information. Local information server 150 may be a local business with a computer for providing main facility 120 with, for example, local ski reports, fishing conditions, menus, etc., or any other suitable provider of information. Link 140 may be a satellite link, a telephone network link, a cable or fiber optic link, a microwave link, an Internet link, a combination of such links, or any other suitable communications link.

The application data transmitted by main facility 120 to interactive application equipment 130 may include television programming data (e.g., program identifiers, times, channels, titles, and descriptions) and other data for services other than television program listings (e.g., help text, pay-per-view information, weather information, sports information, music channel information, associated Internet web links, associated software, etc.). There are preferably numerous pieces or installations of interactive application equipment 130, although only one is shown in FIG. 1 to avoid over-complicating the drawing.

Application data, such as program guide data, may be transmitted by main facility 120 to interactive television program guide equipment 130 using any suitable approach. Data files may, for example, be encapsulated as objects transmitted using a suitable Internet based addressing scheme and protocol stack (e.g., a stack which uses the user datagram protocol (UDP) and Internet protocol (IP)). Systems in which data is transmitted from a main facility to television distribution facilities are described, for example, in Gollahon et al. U.S. patent application Ser. No. 09/332,624, filed Jun. 11, 1999, which is hereby incorporated by reference herein in its entirety.

Application data may include audience information. In another approach, application data and audience information may be received separately (e.g., periodically download guide data and continuously receive audience information).

An interactive television application is implemented on interactive application equipment 130. Five illustrative arrangements for interactive application equipment 130 are shown in FIGS. 2A-2E. As shown, interactive application equipment 130 may include distribution equipment 170 located at distribution facility 180, and user television equipment 200.

Figure 2A:
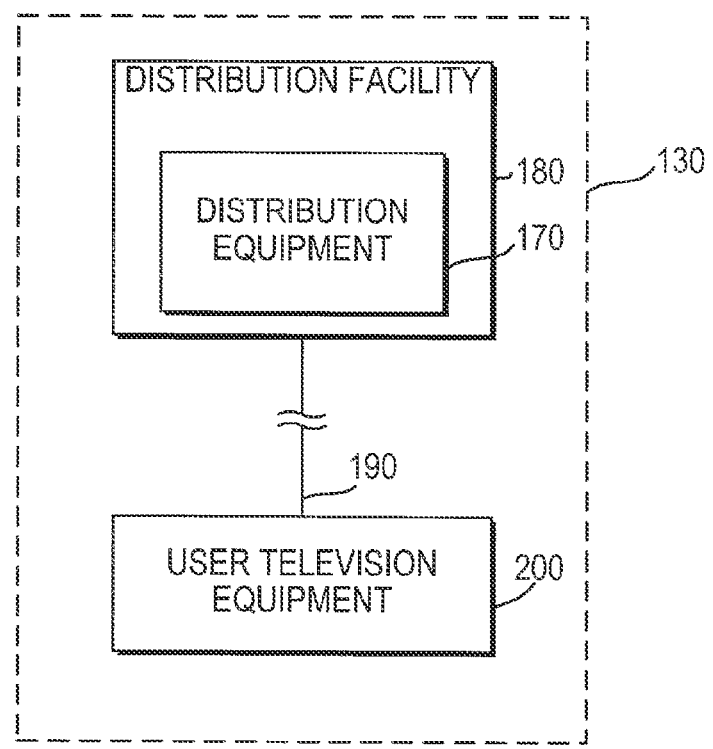
FIGS. 2A-2E show illustrative arrangements for the interactive application equipment of FIG. 1, in accordance with various embodiments of the present invention.
Figure 2B:
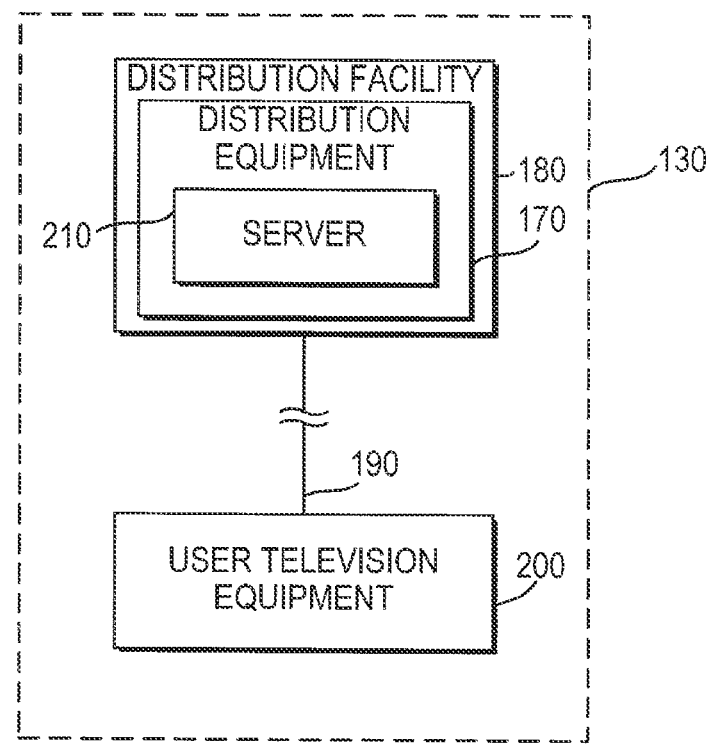
Figure 2C:
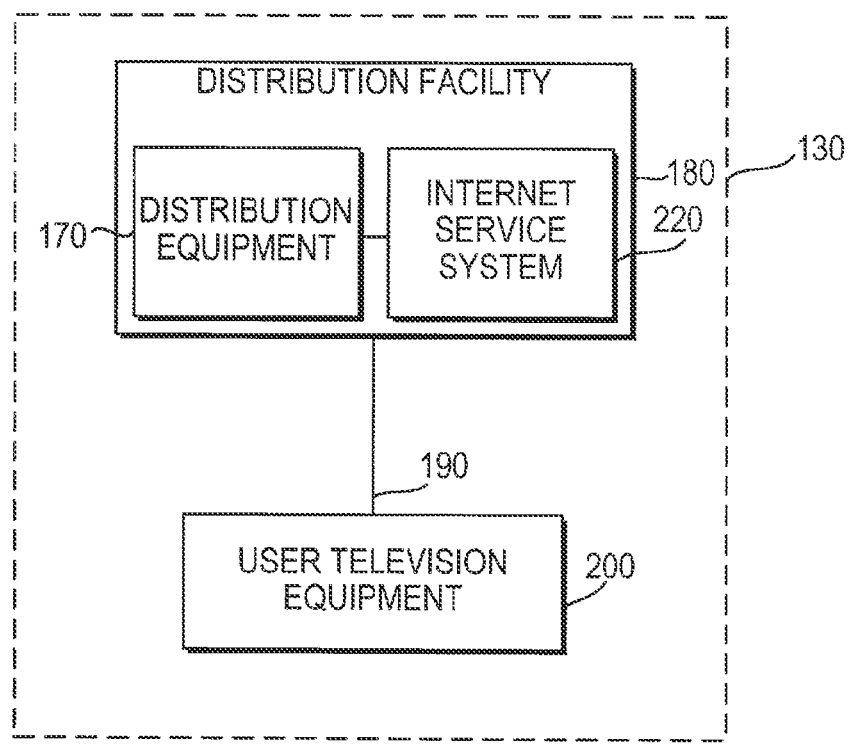
Figure 2D:
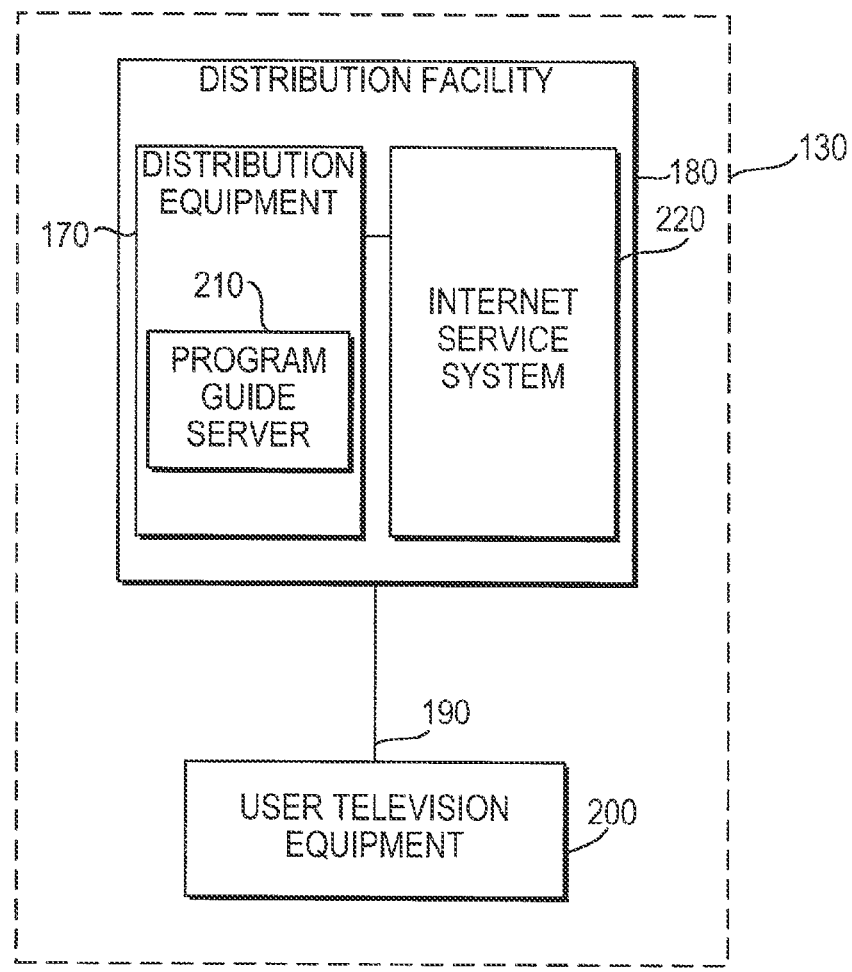

The interactive television application, such as an interactive television program guide, may run totally on user television equipment 200 using the arrangements of FIGS. 2A and 2C, or may run partially on user television equipment 200 and partially on interactive application equipment 130 using a suitable client-server or distributed processing arrangement such as those shown in FIGS. 2B and 2D. Distribution facility 180 may be any suitable distribution facility (e.g., a cable system headend, a broadcast distribution facility, or any other suitable type of distribution facility, and may have distribution equipment 170).

Figure 2E:
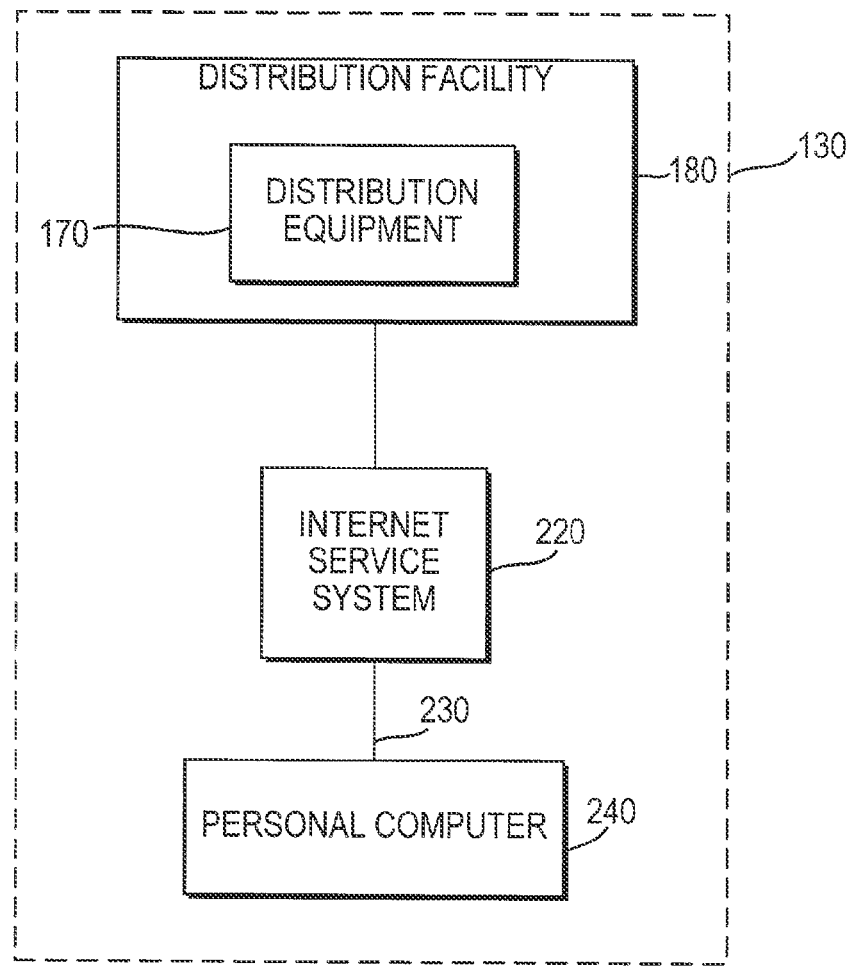

Distribution equipment 170 of FIGS. 2A, 2B, 2C, and 2D is equipment suitable for providing application data to user television equipment 200 over communications path 190. In FIG. 2E, distribution equipment 170 may provide application data, such as program guide data, to Internet service system 220 via, for example, a suitable computer network or Internet link. Distribution equipment 170 may include, for example, suitable transmission hardware for distributing program guide data on a television channel sideband, in the vertical blanking interval of a television channel, using an in-band digital signal, using an out-of-band digital signal, or by any other suitable data transmission technique. Analog or digital video signals (e.g., television programs) may also be distributed by distribution equipment 170 to user television equipment 200 over communications paths 190 on multiple television channels. Alternatively, videos may be distributed to user television equipment 200 from some other suitable distribution facility, such as a cable system headend, a broadcast distribution facility, a satellite television distribution facility, or any other suitable type of television distribution facility.

Communications paths 190 may be any communications paths suitable for distributing application data. Communications paths 190 may include, for example, a satellite link, a telephone network link, a cable or fiber optic link, a microwave link, an Internet link, a data-over-cable service interface specification (DOCSIS) link, a combination of such links, or any other suitable communications link. Communications paths 190 preferably have sufficient bandwidth to allow distribution facility 180 or another distribution facility to distribute television programming to user television equipment 200. There are typically multiple pieces of user television equipment 200 and multiple associated communications paths 190, although only one piece of user television equipment 200 and communications path 190 are shown in FIGS. 2A-2D to avoid over-complicating the drawings. If desired, television programming and application data may be provided over separate communications paths.

FIG. 2B shows an illustrative arrangement for interactive application equipment 130 in a client-server based or distributed interactive application system. As shown in FIG. 2B, distribution equipment 170 may include server 210. Server 210 may use any suitable combination of hardware and software to provide a client-server based application. Server 210 may, for example, run a suitable database engine (e.g., SQL Server by Microsoft) and provide application data in response to queries generated by an application client implemented on user television equipment 200. If desired, server 210 may be located at main facility 120, or other location, such as a cable system headend, a broadcast distribution facility, a satellite television distribution facility, or any other suitable type of television distribution facility.

The application may retrieve application data from server 210 using any suitable client-server based approach. The program guide may, for example, pass SQL requests as messages to server 210. In another suitable approach, the application may invoke remote procedures that reside on server 210 using one or more remote procedure calls. Server 210 may execute SQL statements for such invoked remote procedures. In still another suitable approach, client objects executed by the application may communicate with server objects executed by server 210 using, for example, an object request broker (ORB). This may involve using, for example, Microsoft's Distributed Component Object Model (DCOM) approach.

The program guide implemented on interactive program guide television equipment 130 may communicate with server 210 over communications path 190 using any suitable network and transport layer protocols, if desired. They may communicate, for example, using a protocol stack which includes Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, DOCSIS or any other suitable network and transport layer protocols.

FIGS. 2C and 2D show illustrative Internet-based interactive television application systems. Distribution facility 180 may, for example, include Internet service system 220. Internet service system 220 may use any suitable combination of hardware and software capable of providing application data to the guide using an Internet based approach (e.g., the HyperText Transfer Protocol (HTTP)). If desired, Internet service system 220 may be located at a facility that is separate from distribution facility 180.

If the application is implemented on user television equipment 200 of interactive application equipment 130 as shown in FIG. 2C, Internet service system 220 (or other suitable equipment at distribution facility 180 that is connected to Internet service system 220) may provide application data to user television equipment 200 via the Internet, or via distribution equipment 170 using any suitable Internet-based approach (e.g., using the HyperText Transfer Protocol (HTTP) over a Transmission Control Protocol/Internet Protocol (TCP/IP) type link). If the interactive television application implemented on interactive application equipment 130 is a client-server guide as shown in FIG. 2D, server 210 may obtain application data from Internet service system 220. The application may also, however, obtain application data from Internet service system 220 via an Internet connection.

In another suitable arrangement, distribution equipment 170 may include computer equipment or other suitable hardware on which a first portion or version of the interactive television application is implemented. A second portion or version of the application may be implemented on user television equipment 200. The two versions or portions of the interactive program guide may communicate using any suitable peer-to-peer communications scheme (e.g., messaging, remote procedure calls, etc.) and perform interactive application functions distributively between distribution facility 180 and user television equipment 200.

Another suitable arrangement in which an on-line application, such as an on-line program guide, is implemented on interactive application equipment 130 is shown in FIG. 2E. On-line program guide systems are described, for example, in Boyer et al. U.S. patent application Ser. No. 08/938,028, filed Sep. 18, 1997, which is hereby incorporated by reference herein in its entirety. The user may have personal computer (PC) 240 on which an application client or web browser is implemented. Personal computer 240 may be connected to Internet service system 220 via Internet link 230. Internet service system 220 may use any suitable combination of computer hardware and software capable of providing an on-line server application or web site. Internet service system 220 is shown as obtaining application data from distribution facility 180. In other suitable approaches, Internet service system 220 may obtain information from other systems such as, for example, main facility 120, local information service 150, or any other suitable source of application data.

Application data may be stored in set-top box for use by the application. For example, two weeks of television program listings data may be stored by the application. All or part of the application data may be provided on-demand or in a continuous or periodic data stream, or using any other suitable approach. The application data may include universal identifiers for programs. The identifiers may be used by the application on playback or recording to indicate to the system provider what programs are being played back or recorded. The application data may include identifiers for commercials, scenes within programs, or any other media or portion of media, to attempt to maximize the granularity of the feedback. The system provider may be a program guide provider, a television service provider, Internet service providers, application providers, cable system operators, broadcast or satellite television operators, etc. Application data may include audience information. However, application data and audience information may be received separately.

In some embodiments, local information service 150 may be any suitable facility for measuring or receiving audience information particular to a localized region. Local information service 150 may provide audience information to main facility 120 over communications link 140 for accumulation at distribution facility 180 (e.g., a cable system headend). Local information service may be used to obtain, for example, national and local audience information.

Audience information may be received by audience detection equipment 155 or any other suitable equipment capable of measuring audience information. Audience detection equipment 155 may collect audience information from one or more interactive application equipments 130 (e.g., the set-top box) via link 140. In some embodiments, audience detection equipment 155 may be part of interactive application equipment 130, part of main facility 120, or may be separate. Audience information may be stored in audience detection equipment 155, in interactive application equipment 130, or any other suitable equipment for storing information.

Interactive application equipment 130 may detect audience information according to the given approaches shown in FIGS. 2A-2E. Some embodiments of the present invention may obtain audience information from user television equipment 200. Audience information may be transmitted from each user television equipment 200 to distribution facility 180 via communications link 190. Audience information may be accumulated at distribution facility 180. Distribution facility 180 may distribute the accumulated audience information to user television equipment 200. In another suitable approach, audience information may be accumulated by main facility 160. Audience information stored at distribution facility 180 may be transmitted to main facility 160 for accumulation. Main facility 160 may accumulate audience information and distribute the audience information to user television equipment 200.

Audience information may be distributed to the user's equipment using any suitable approach. Audience information may be distributed, for example, automatically for all or a subset of media as the media is distributed. Audience information may be provided with media (e.g., in the vertical blanking interval (VBI) or in a digital field), or separate from the media. Alternatively, the data may be requested from a server (e.g., server 210) only as it is needed for display.

Figure 3:
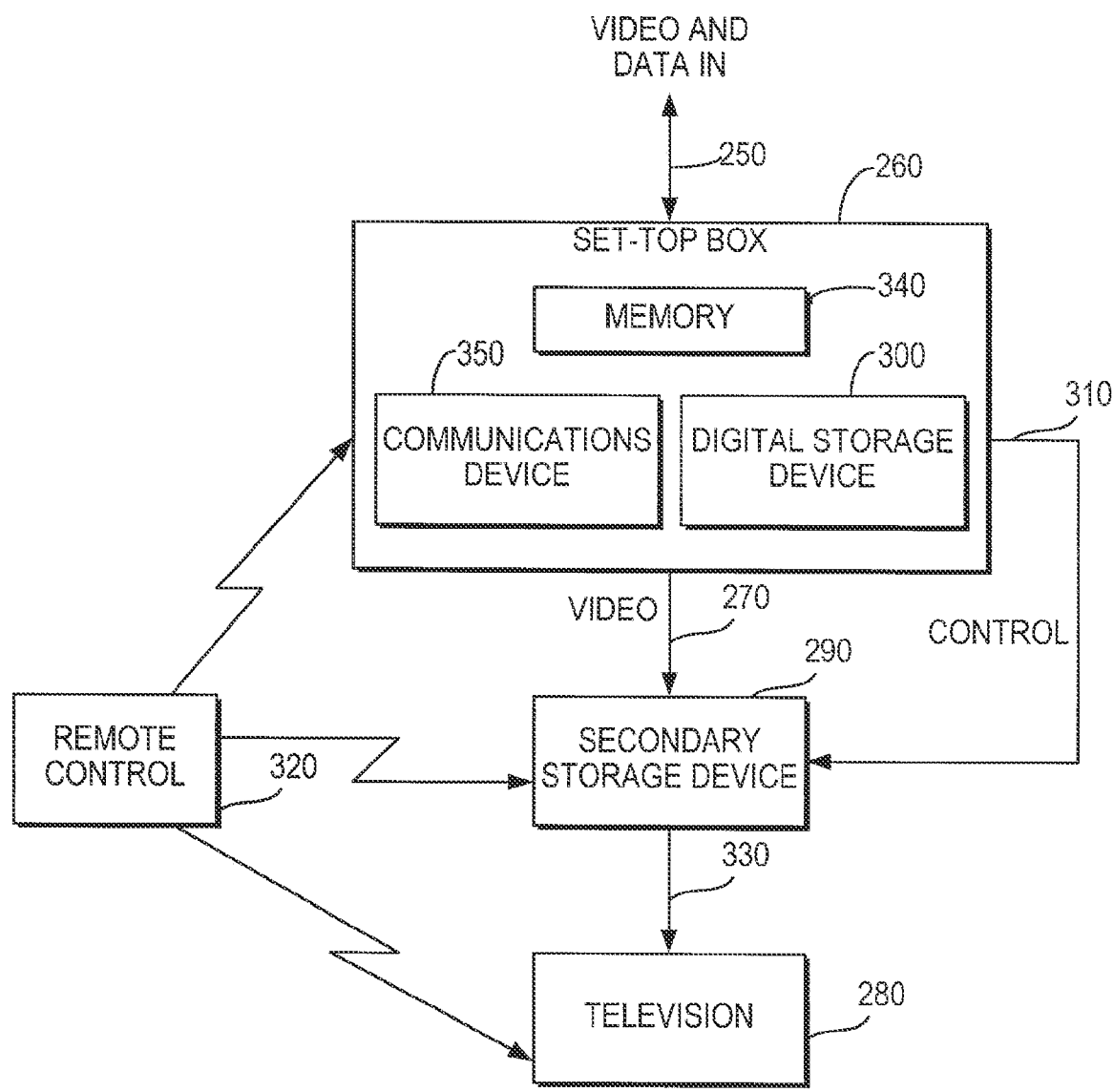
FIG. 3 is an illustrative schematic block diagram of user television equipment of FIGS. 2A-2E, in accordance with one embodiment of the present invention.

An illustrative arrangement for user television equipment 200 is shown in FIG. 3. User television equipment 200 of FIG. 3 receives video or a digital video stream and data from distribution facility 180 (FIG. 2*a*), such as a program distribution facility or some other suitable distribution facility, at input 250. During normal television viewing, a user tunes set-top box 260 to a desired television channel. The signal for that television channel is then provided at video output 270. The signal supplied at output 270 is typically either a radio-frequency (RF) signal on a predefined channel (e.g., channel 3 or 4), or an analog demodulated video signal, but may also be a digital signal provided to television 280 on an appropriate digital bus (e.g., a bus using the Institute of Electrical and Electronics Engineers (IEEE) 1394 standard, (not shown)). The video signal at output 270 is received by optional secondary storage device 290.

The interactive television application may run on set-top box 260, on television 280 (if television 280 has suitable processing circuitry and memory), on a suitable analog or digital receiver connected to television 280, or on digital storage device 300 if digital storage device 300 has suitable processing circuitry and memory. The interactive television application may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 290 can be any suitable type of analog or digital program storage device or player (e.g., a videocassette recorder (VCR), a personal video recorder (PVR), a digital versatile disc (DVD) player, etc.). Program recording and other features may be controlled by set-top box 260 using control path 310. If secondary storage device 290 is a videocassette recorder or a personal video recorder, for example, a typical control path 310 involves the use of an infrared transmitter coupled to the infrared receiver in the recorder that normally accepts commands from a remote control such as remote control 320. Remote control 320 may be used to control set-top box 260, secondary storage device 290, and television 280.

If desired, a user may record programs, application data, or a combination thereof in digital form on optional digital storage device 300. Digital storage device 300 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 300 can be contained in set-top box 260 or it can be an external device connected to set-top box 260 via an output port and appropriate interface. If necessary, processing circuitry in set-top box 260 formats the received video, audio and data signals into a digital file format. Preferably, the file format is an open file format such as the Moving Picture Experts Group (MPEG) MPEG-2 standard or the Moving Joint Photographic Experts Group (MJPEG) standard. The resulting data is streamed to digital storage device 300 via an appropriate bus (e.g., a bus using the Institute Electrical and Electronics Engineers (IEEE) 1394 standard), and is stored on digital storage device 300.

In another suitable approach, an MPEG-2 data stream or series of files may be received from distribution equipment 170 and stored.

Television 280 receives video signals from secondary storage device 290 via communications path 330. The video signals on communications path 330 may either be generated by secondary storage device 290 when playing back a prerecorded storage medium (e.g., a videocassette or a recordable digital video disc), by digital storage device 300 when playing back a pre-recorded digital medium, may be passed through from set-top box 260, may be provided directly to television 280 from set-top box 260 if secondary storage device 290 is not included in user television equipment 200, or may be received directly by television 280. During normal television viewing, the video signals provided to television 280 correspond to the desired channel to which a user has tuned with set-top box 260. Video signals may also be provided to television 280 by set-top box 260 when set-top box 260 is used to play back information stored on digital storage device 300.

Set-top box 260 may have memory 340. Memory 340 may be any memory or other storage device, such as a random access memory (RAM), read only memory (ROM), flash memory, a hard disk drive, a combination of such devices, etc., that is suitable for storing program guide application instructions and application data for use by the interactive application.

Set-top box 260 may have communications device 350 for communicating directly with distribution equipment 170, server 210 or Internet service system 220 over communications path 190. Communications device 350 may be a modem (e.g., any suitable analog or digital standard, cellular, or cable modem), network interface card (e.g., an Ethernet card, Token ring card, etc.), or other suitable communications device. Communications device 350 may also be a personal computer with an Internet connection in, for example, the arrangement shown in FIGS. 2C and 2D. Television 280 may also have such a suitable communications device if desired. In an alternative approach, user television equipment 200 may communicate with Internet service system 220 via distribution equipment 170 using a suitable return path.

Figure 4:
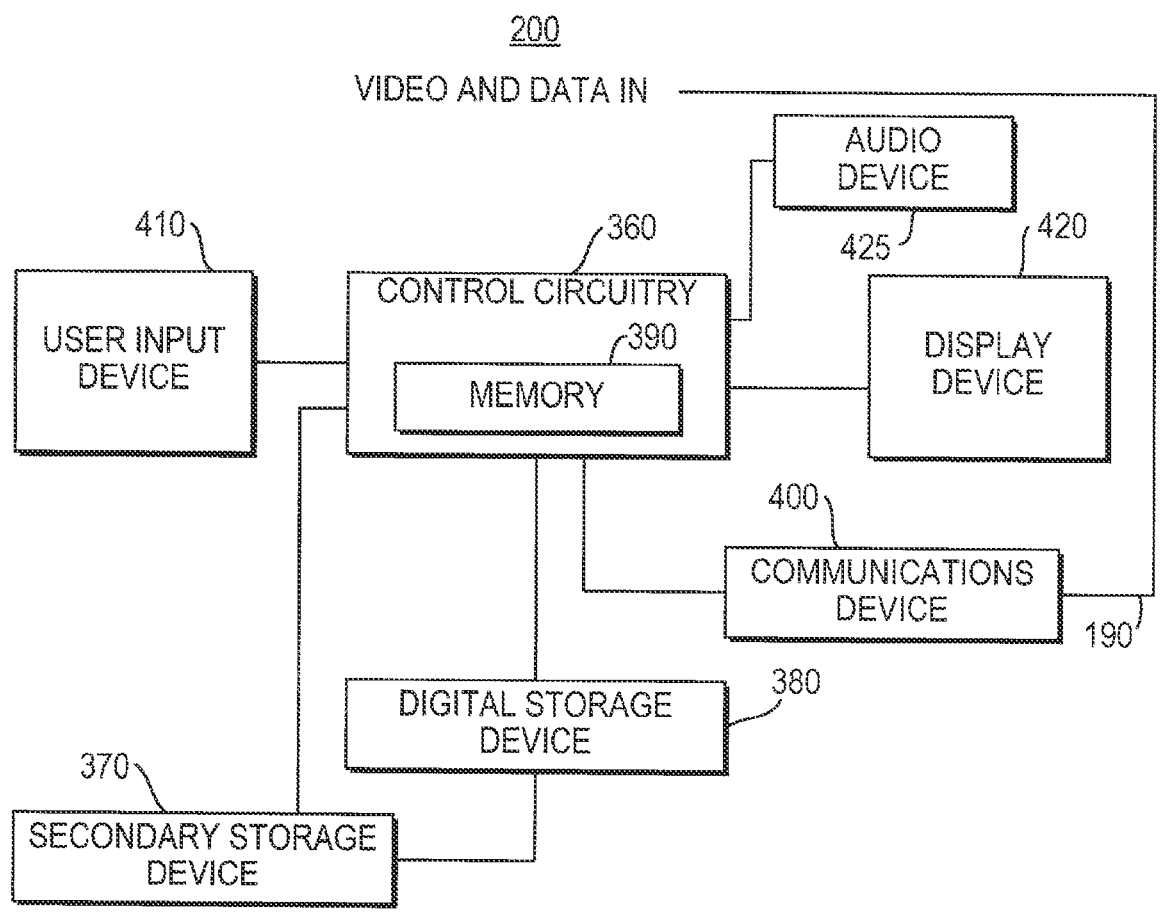
FIG. 4 is a generalized schematic block diagram of portions of the illustrative user television equipment of FIG. 3, in accordance with one embodiment of the present invention.

A more generalized embodiment of user television equipment 200 of FIG. 3 is shown in FIG. 4. As shown in FIG. 4, program guide data from distribution facility 180 (FIG. 2*a*) is received by control circuitry 360 of user television equipment 200. The functions of control circuitry 360 may be provided using the set-top box arrangement of FIGS. 2*a* and 2*b*. Alternatively, these functions may be integrated into an advanced television receiver, personal computer television (PC/TV), or any other suitable arrangement. If desired, a combination of such arrangements may be used.

User television equipment 200 may also have secondary storage device 370 and digital storage device 380 for recording programming. Secondary storage device 370 can be any suitable type of analog or digital program storage device (e.g., a videocassette recorder (VCR), a personal video recorder (PVR), a digital versatile disc (DVD), etc.). Program recording and other features may be controlled by control circuitry 360. Digital storage device 380 may be, for example, a writeable optical storage device (such as a DVD player capable of handling recordable DVD discs), a magnetic storage device (such as a disk drive or digital tape), or any other digital storage device.

User television equipment 200 may also have memory 390. Memory 390 may be any memory or other storage device, such as a random access memory (RAM), read only memory (ROM), flash memory, a hard disk drive, a combination of such devices, etc., that is suitable for storing application instructions and application data for use by control circuitry 360.

User television equipment 200 of FIG. 4 may also have communications device 400 for supporting communications between the application and distribution equipment 170, server 210, or Internet service system 220 via communications path 190. Communications device 400 may be a modem (e.g., any suitable analog or digital standard, cellular, or cable modem), network interface card (e.g., an Ethernet card, Token ring card, etc.), or other suitable communications device.

A user may control the operation of user television equipment 200 with user input device 410. User input device 410 may be a pointing device, wireless remote control, keyboard, touch-pad, voice recognition system, or any other suitable user input device. To watch television, a user instructs control circuitry 360 to display a desired television channel on display device 420. Display device 420 may be any suitable television, monitor, or other suitable display device. To access the functions of the application, a user may instruct the application implemented on interactive television program guide equipment 130 to generate a main menu or other desired display for display on display device 420. To access sound, a user may instruct control circuitry 360 to provide audio media on audio device 425. Audio device 425 may be part of display device 420, or may be separate.

Some embodiments may present users with audience measurements of programs to indicate the popularity of the program. Programs may include television programs, pay-per-view (PPV) programs, near-video-on-demand (NVOD) programs, video-on-demand (VOD) programs, music, advertisements, promotional materials, or any other video or audio media. FIGS. 5-15 show illustrative displays for providing audience measurement information. In the examples of FIGS. 5-15, audience information is provided by an interactive television application. Although the present invention is described primarily in the context of an interactive television program guide, user interfaces may be part of an audio application, a video application, or any other suitable guidance application.

The displays described herein may include flip bar 505 or a video or an application which is superimposed onto display 500. Flip bar 505 may, for example, identify the user's current channel and program. Flip bar 505 may provide the user with, for example, interactive advertisement 510, program description area 515, logo 520, and current time 525. In addition to program descriptions, program description area may also include channel indicator 530 and parental rating 535. Interactive advertisement 510 may be displayed as part of display 500. If desired, advertisement 510 may also be passive. Flip bar 505 may disappear (e.g., fade away) after a predetermined time of inactivity.

Figure 5:
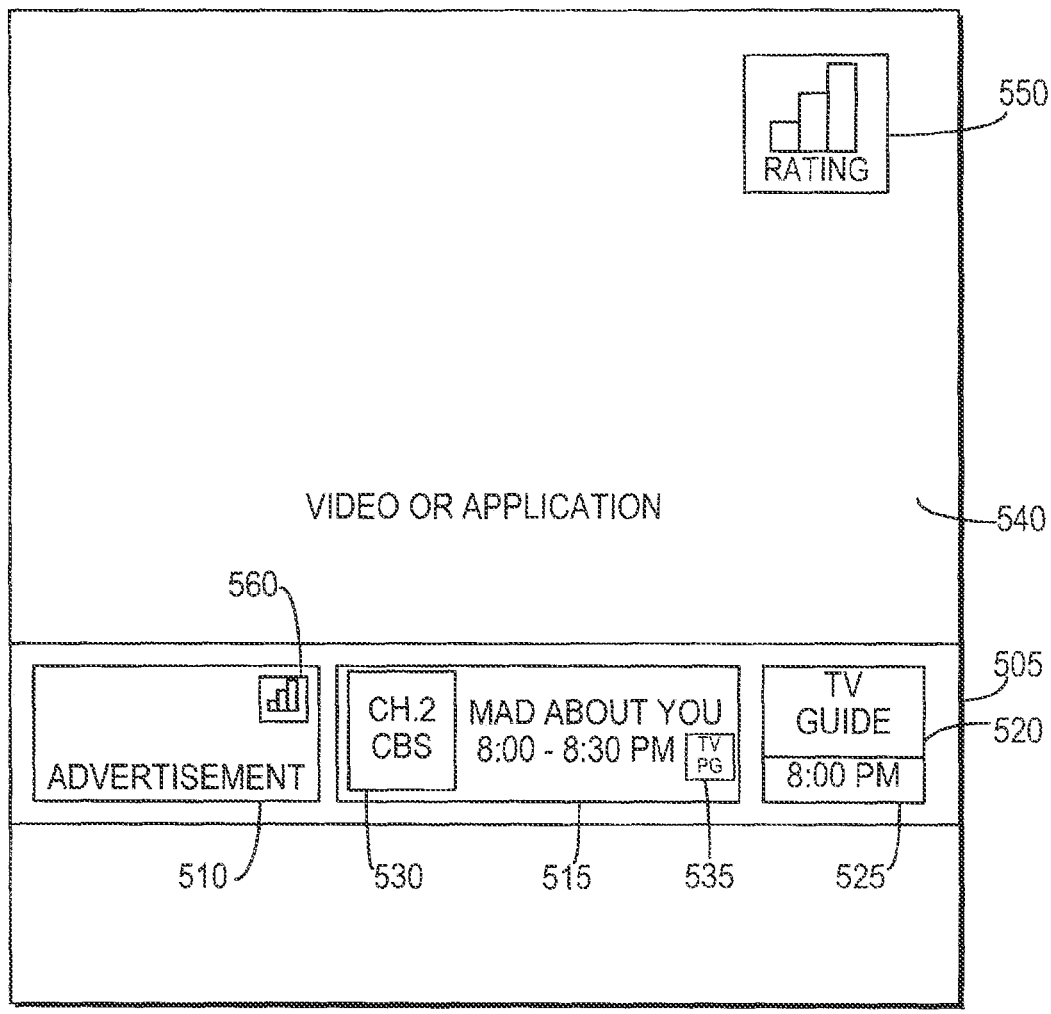
FIG. 5 is an illustrative display that may be displayed by the interactive television application when the user tunes to a channel, in accordance with one embodiment of the present invention.

Some embodiments may provide users with audience information when, for example, users change channels. Audience information may be provided with flip displays, browse displays, program listings, advertisements, or any other suitable display. FIG. 5 shows an illustrative display 500 that may be displayed when the user flips through channels (e.g., flip display). Display 500, as well as other displays described herein, may provide the user with audience information. The audience information may be overlaid onto the program the user is watching, played over audio media, may be displayed when a user selects a program listing from a guidance application, may be displayed as the user browses through program listings, may be displayed when a user selects recorded media for playback, or may be displayed when a user selects audience information icon 550. For example, display 500 may contain options for various program guide functions. When the user decides to flip to another program or another application by, for example, using the remote control, display 500 may present audience information relating to the user's current video or application. In another suitable approach, audience information relating to the user's current video or application may be presented when the user selects audience information icon 550. In some embodiments, audience information icon 550 or audience information may be displayed for a predefined period of time when the user first accesses display 500, and then may disappear. Any other approach for displaying audience information may also be used.

Audience information may provide the user with ratings, the audience size for a particular program, the market share of a particular program, or any other suitable information related to the audience of a program or other media. Audience information may have been obtained by conventional means or in response to the playback or recording of media.

Figure 6:
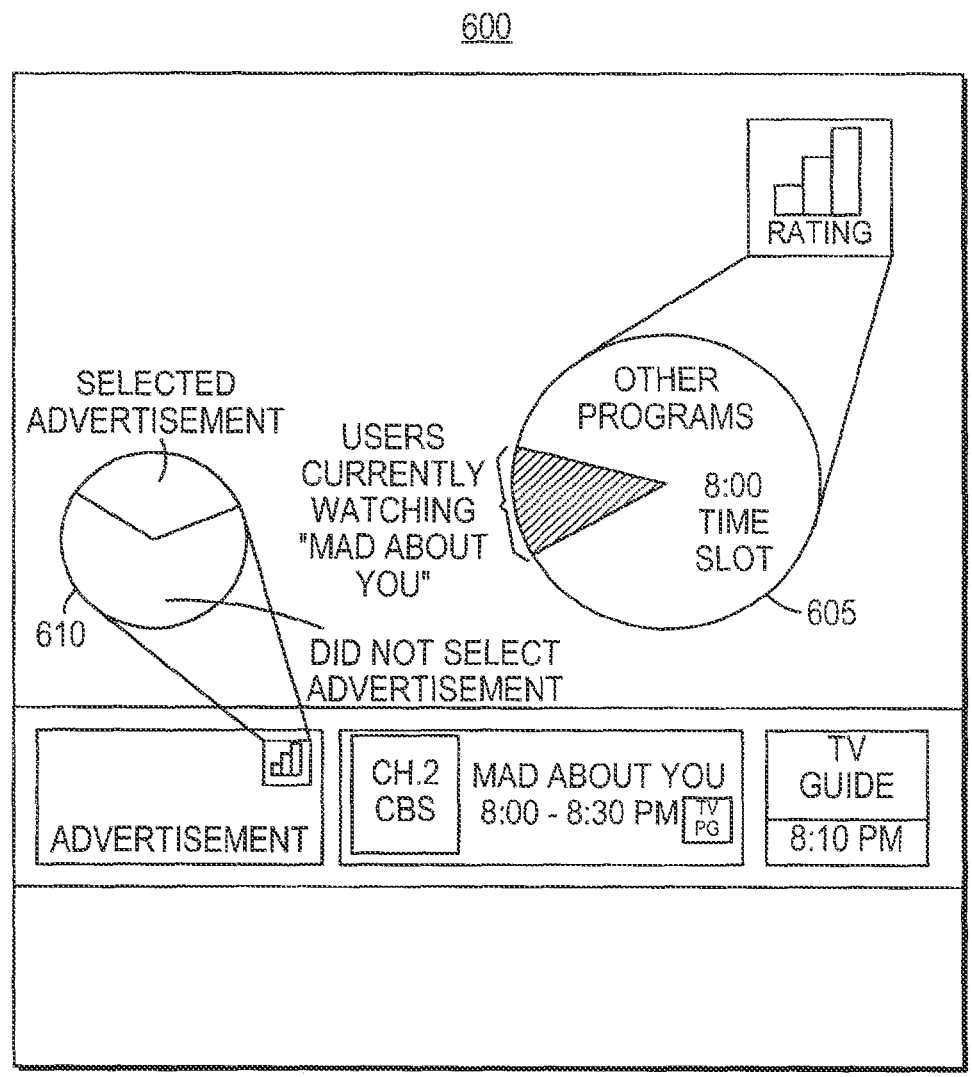
FIG. 6 is an illustrative display that presents the user with audience information, in accordance with one embodiment of the present invention.

Audience information may, for example, present to the user the audience size of a program that is currently being viewed, recorded, or a combination thereof, in real time as shown in FIG. 6. Display 600 may present audience information to the user by overlaying graphic 605, for example, a pie chart, illustrating the program the user is currently watching compared with the other programs at that time slot. The system may present audience information or audience information icon 550 using any suitable passive or interactive text, graphics, animations, video, audio, any combination thereof, or any other suitable content.

Some embodiments may provide audience information upon the user's request. Audience information may be requested from a server only as it is needed for display. The user may obtain audience information by, for example, clicking on audience information icon 550 (FIG. 5) or by pressing a specific key on the remote control when audience information icon 550 is displayed or highlighted. Upon clicking audience information icon 550 or clicking on the displayed audience information, the display (e.g., display 500) may, for example, be replaced and the user may be presented with another display with graphic 605 overlaid onto the display.

Some embodiments may track advertisements (e.g., commercials or any other promotional material) to determine the appeal of the advertisements. Display 500 may present users with advertisement audience information for advertisements. Advertisement audience information 560 may include ratings, the audience size for the advertisement, the market share of the advertisement, or any other suitable information. Advertisement audience information 560 may be overlaid onto advertisement 510, may be displayed when a user selects advertisement 510, may be displayed as the user browses through advertisements, may be displayed when a user selects recorded media for playback, or using any other suitable approach.

In another suitable approach, display 600 may present advertisement audience information to the user by overlaying graphic 610, for example, a pie chart, illustrating the popularity of the advertisement the user is currently watching. The system may present advertisement audience information 560 using any suitable passive or interactive text, graphics, animations, video, audio, any combination thereof, or any other suitable content. Program guide systems with monitoring of advertisement usage are described, for example, in Thomas et al. U.S. patent application Ser. No.

09/139,798, filed Aug. 25, 1998, which is hereby incorporated by reference herein in its entirety.

Figure 7:
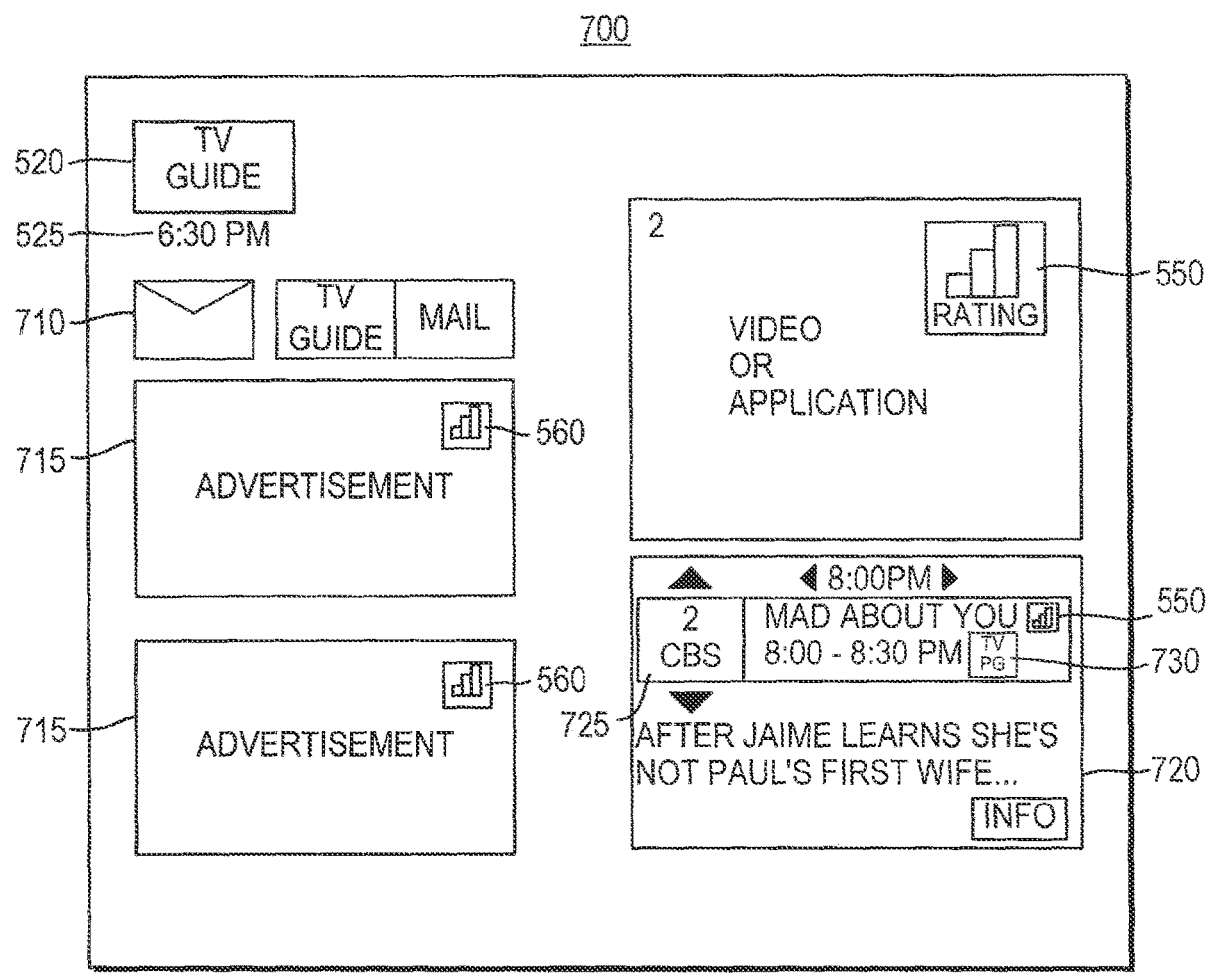
FIG. 7 is an illustrative display that may be displayed by the interactive television application when the user browses through programs, in accordance with one embodiment of the present invention.
Figure 8:
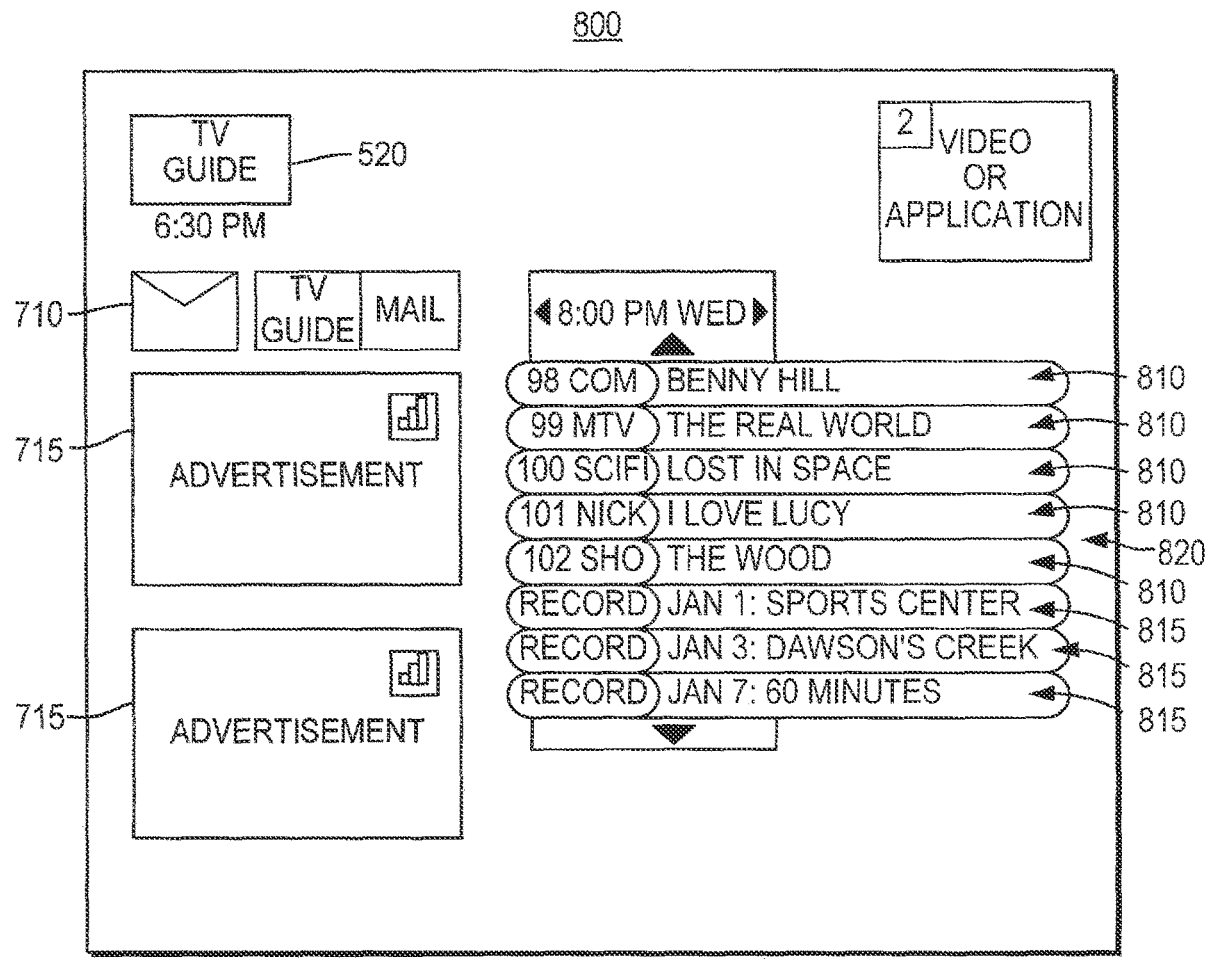
FIG. 8 is an illustrative display that may be displayed by the interactive television application when the user browses through media listings, in accordance with one embodiment of the present invention.

Some embodiments may present the user with audience information in browse displays. FIG. 7 shows an illustrative browse display 700. The interactive television application may display browse display 700. In response to, for example, the user selecting a button on the remote control, display 700 may be displayed. Display 700 may, for example, allow users to continue watching a program on a particular channel while browsing information for programs that are playing on other channels and at other times. In another approach, browse display 700 may, for example, be similar to flip display 500. Display 700 may include a number of graphics and advertisements, such as, for example, logo 520, time 525, mail 710, interactive advertisements 715, and any other suitable graphics or advertisements. One or more interactive advertisements 715 may be displayed as part of display 700. If desired, advertisements 715 may also be passive.

Display 700 may allow users to indicate a desire to browse through program listings for other channels and time slots by, for example, pressing "up", "down", "left", and "right" arrows on the remote control. Display 700 may include the user's current video or application which is superimposed onto display 700. Display 700 may also include browse bar 720 that may, for example, identify the user's selected channel and program. In addition to program descriptions, browse bar 720 may also include channel indicator 725 and parental rating 730. Display 700 may also include audience information. Display 700 may also include audience information icon 550. Audience information or audience information icon 550 may be overlaid onto the user's currently selected video or application. Audience information icon 550 may also be overlaid onto browse bar 720. Audience information may provide the user with ratings, the audience size for a particular program, the market share of a particular program, or any other suitable information related to the current program or the selected program. The system may present audience information and audience information icon 550 using any suitable passive or interactive text, graphics, animations, video, audio, any combination thereof, or any other suitable content.

The interactive television application or any other guidance application may present audience information with program listings. For example, illustrative display 800 of FIG. 8 may be displayed by an interactive television application to provide users with program listings for current and recorded programs. Display 800 includes program listings region 820 that contains one or more program listings (e.g., listings 810, listings 815). One or more listings 810 may provide the user with information about programs on specific channels showing at a particular time. Listings 810 includes the names of programs showing at 8:00 PM on channel 98 through channel 102. However, listings 810 and listings 815 may include other media-related information, such as program descriptions, ratings, audience information (or an icon indicating the availability of audience information), and other suitable information. Display 800 may provide listings 815 so that the user may access listings of recorded media. Listings 815 includes the names of programs and the date of recordation recorded by, for example, a PVR device. Display 800 may also include logo 520, advertisements 715, mail 710, any other graphics, any other animations, or any other suitable content.

As illustrated, program listings region 820 provides program listings in a list and displays the channel number, call letters, and program title for a given time slot. The listings shown is merely illustrative. Any other suitable approach may be used.

Figure 9:
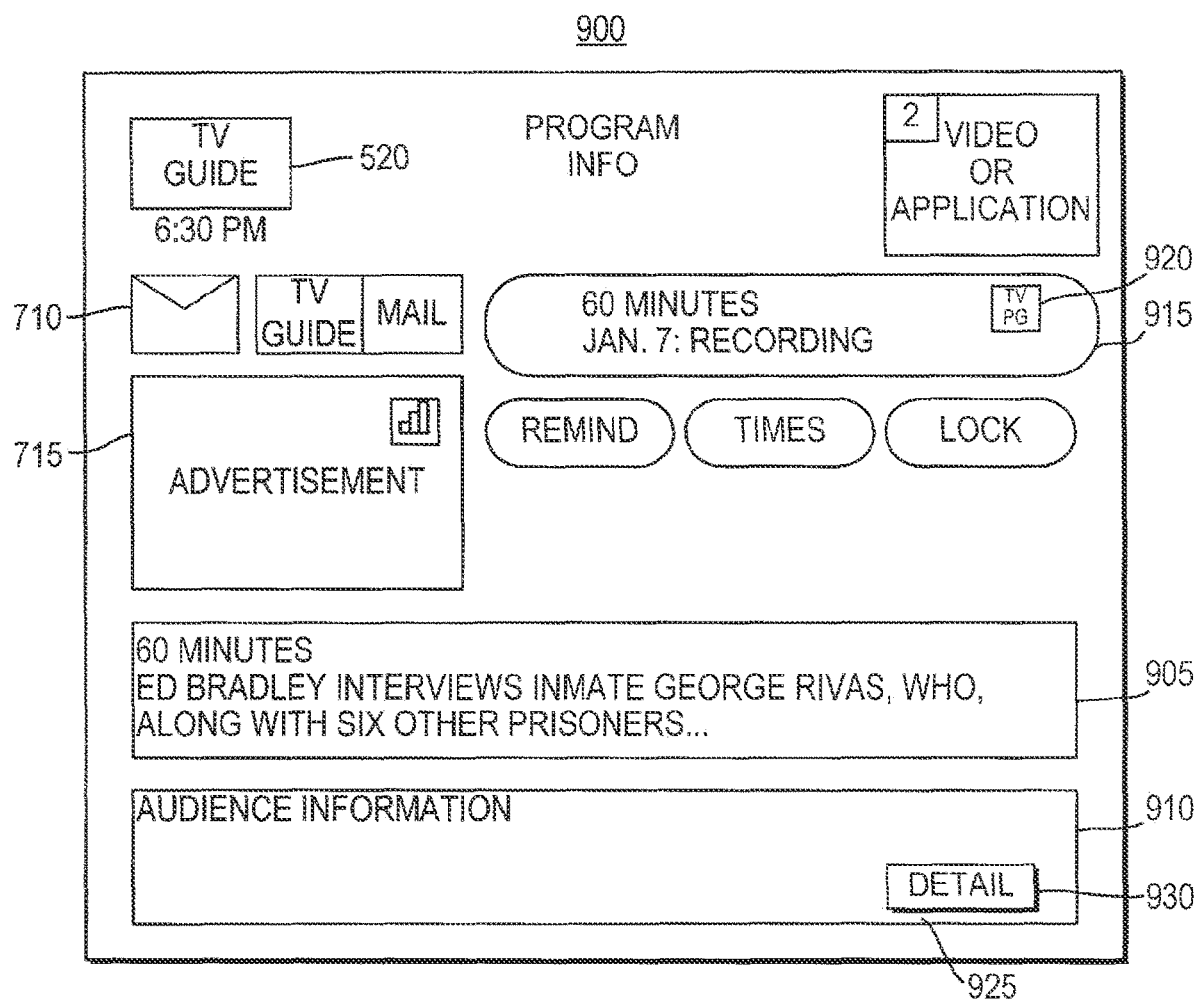
FIG. 9 is an illustrative display that may be displayed by the interactive television application for providing the user with additional information for media, in accordance with one embodiment of the present invention.

A user may indicate a desire to access additional information for a listing by, for example, selecting a listing. Upon the user selecting a listing, such as "January 7: 60 Minutes," the interactive television application may present program information. An illustrative display 900 is shown in FIG. 9. Display 900 may include, for example, the title of the program (e.g., in title area 915), a description of the program (e.g., description 905), the rating of the program (e.g., rating 920), or any other suitable information. If the program was recorded by the user, display 900 may provide the date and time of recording. If the program will be aired, display 900 may, for example, present the user with the channel and time when the program will be aired.

Program information display 900 may also provide the user with audience information. Audience information area 910 may include, for example, the number of times the program has been played back, the audience size or the market share of the program that is currently being viewed or recorded, or any other suitable information. Audience information area 910 also includes "DETAIL" button 925. As shown, the user may select "DETAIL" button 925 by placing highlight region 930 over button 925 and, for example, pressing "OK" key on the remote control. "DETAIL" button 925 may provide the user with additional audience information. Audience information area 910 may include any suitable interactive or passive text, graphics, animations, audio, video, any combination thereof, or any other suitable context. As in any display described, display 900 may also include a number of graphics, animations, selectable advertisements, video windows, or any other suitable content.

Figure 10:
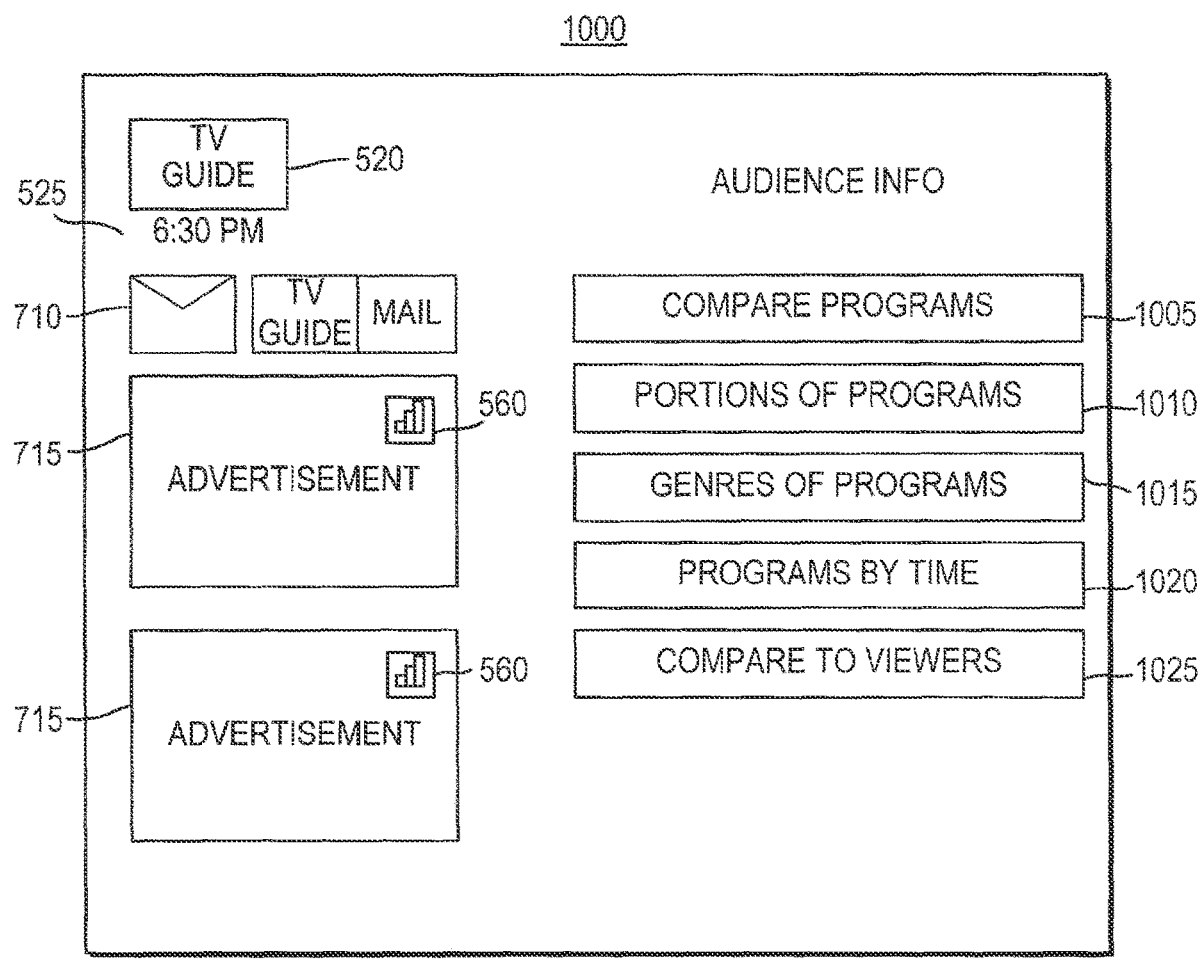
FIG. 10 is an illustrative display that may be displayed by the interactive television application for providing the user with an additional audience information menu, in accordance with one embodiment of the present invention.

Upon the user highlighting "DETAIL" button 925 and pressing the "OK" key on the remote control, the interactive television application may provide detailed audience information. An illustrative detailed audience information display 1000 is shown in FIG. 10. Display 1000 may include "Compare Programs" button 1005, "Portions of Programs" button 1010, "Genres of Programs" button 1015, "Programs by Time" button 1020, and "Compare to Viewers" button 1025.

Figure 11:
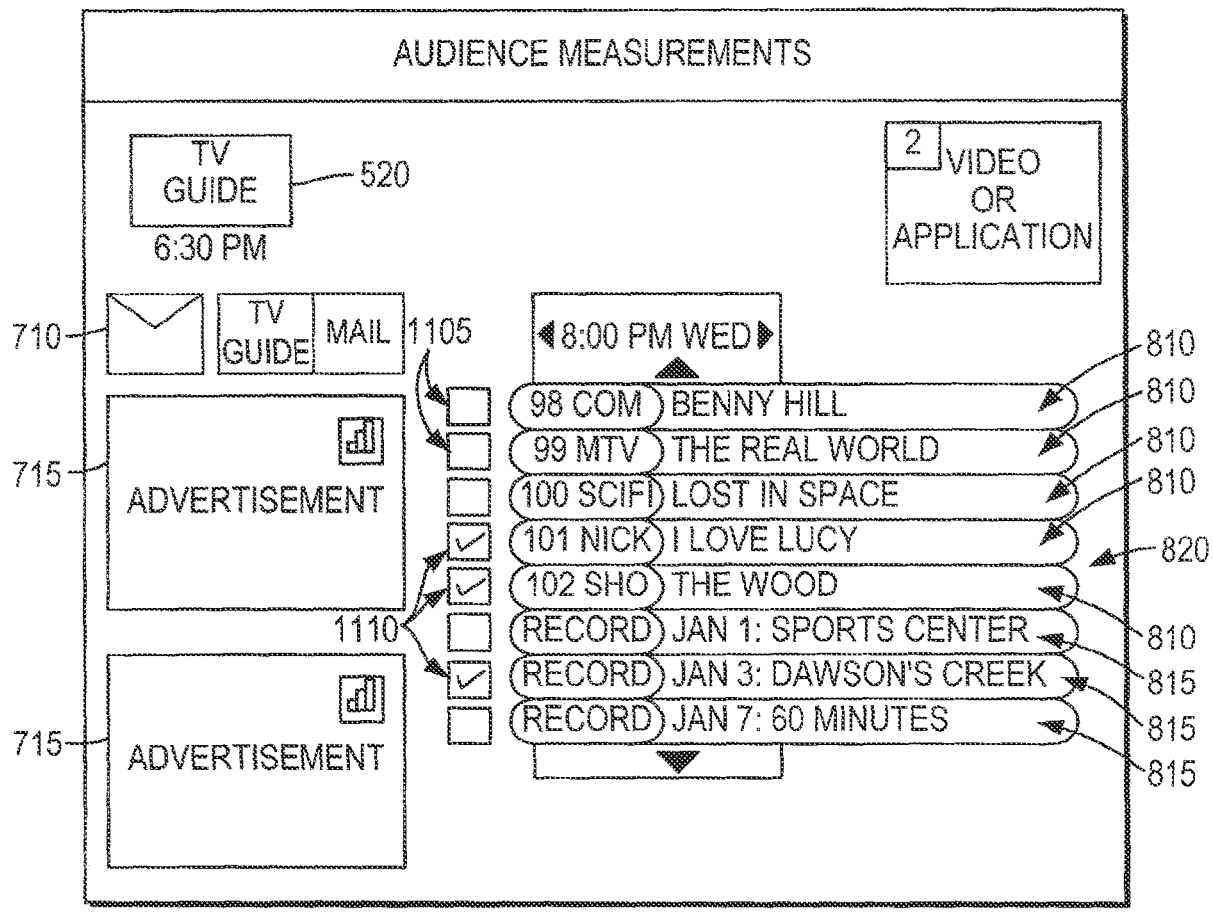
FIG. 11 is an illustrative display that may be displayed by the interactive television application when the user selects media for comparing audience information, in accordance with one embodiment of the present invention.
Figure 12:
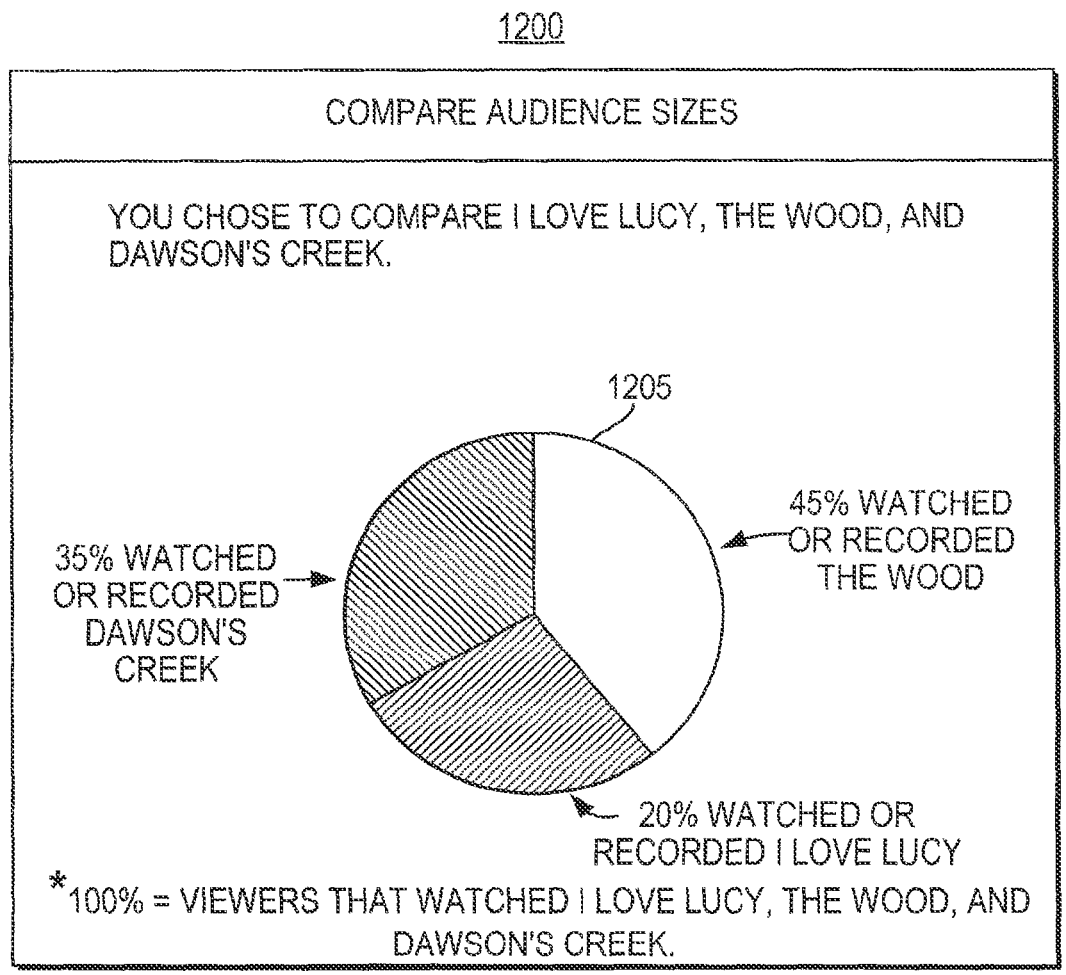
FIG. 12 is an illustrative display that may be displayed by the interactive television application for providing audience information comparisons, in accordance with one embodiment of the present invention.

"Compare Programs" button 1005 may allow the user to compare the audience information of multiple programs or other media. Upon the user selecting button 1005, the interactive television application may present the user with illustrative display 1100 as shown in FIG. 11. Display 1100 may provide programs listings region 820 that contains a number of program listings, such as listings 810 and listings 815. Display 1100 may also include check box 1105 adjacent to each program listing. The user may select which media to compare by, for example, placing indicator 1110 into check box 1105. As shown in FIG. 11, the user has selected to compare the audience information for "I Love Lucy," "The Wood," and "Dawson's Creek." Upon selecting media and, for example, pressing the "OK" key on the remote control, the application may be transfer the user to illustrative display 1200 as shown in FIG. 12. Audience information may be displayed in display 1200. As shown in FIG. 12, graphic 1205 is a pie chart that illustrates the comparison of the audience sizes between "I Love Lucy," "The Wood," and "Dawson's Creek." Audience information may be provided by overlaying graphic 1205. Graphic 1205 may be a pie chart, graph, or any suitable content for providing the comparison of audience measurements.

Figure 13:
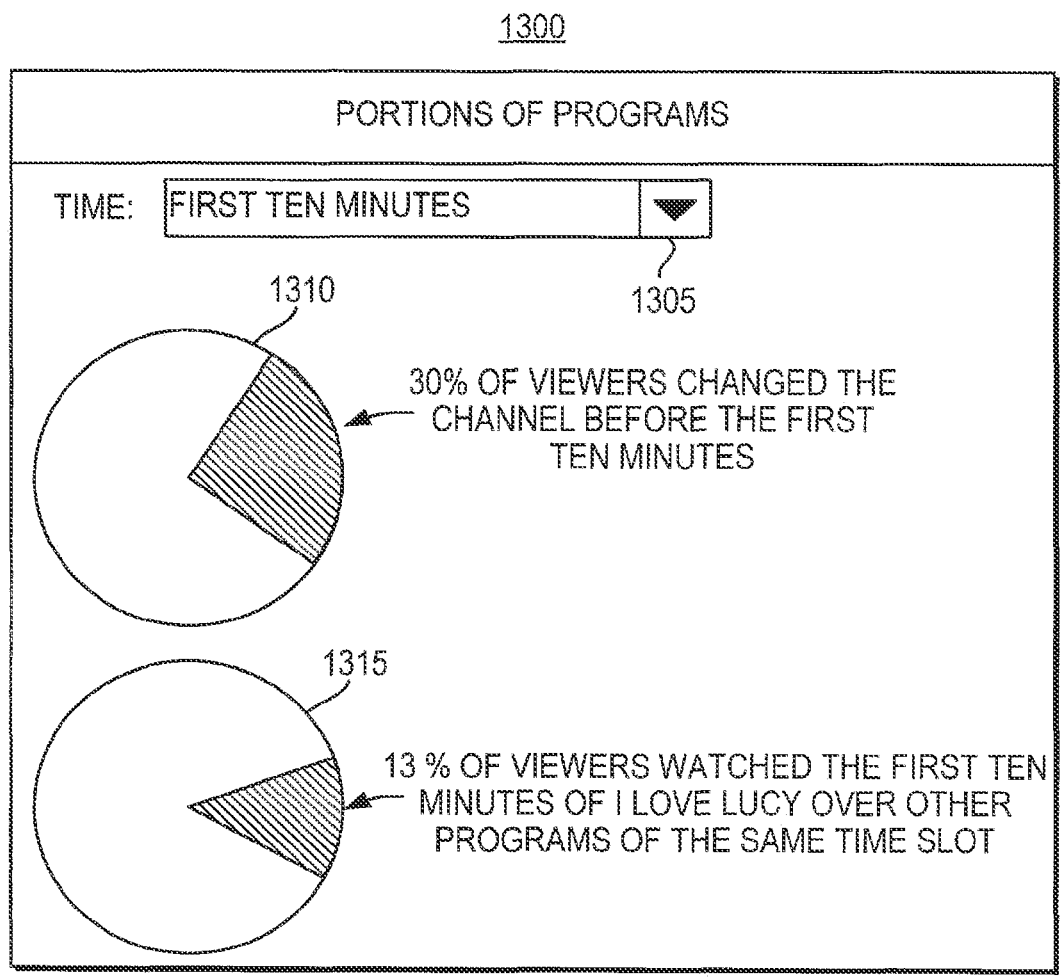
FIG. 13 is an illustrative display that may be displayed by the interactive television application for providing audience information for portions of programs, in accordance with one embodiment of the present invention.

"Portion of Programs" button 1010 may allow the user to view the audience information of media at particular times. For example, the user may view audience information for a scene within a program. Upon the user selecting button 1010, the interactive television application may present the user with illustrative display 1300 as shown in FIG. 13. Display 1300 includes menu bar 1305 which may provide portions of time. Menu bar 1305 may be a drop-down menu, pop-up window, or any other suitable interface. In some embodiments, menu bar 1305 may include scene names for the selected media. As shown in FIG. 13, menu bar 1305 is set to provide audience information for the first ten minutes of the program. Audience information may be provided by overlaying graphic 1310 and graphic 1315. Graphic 1310 and graphic 1315 may display audience information. For example, graphic 1310 displays the number of users that changed the channel during the first ten minutes of the program. Graphic 1315 displays the number of users that watched or recorded the first ten minutes of "I Love Lucy" versus watching any other program at the same time slot. Graphic 1310 and graphic 1315 may be a pie chart, graph, or any suitable content for providing audience measurements.

Figure 14:
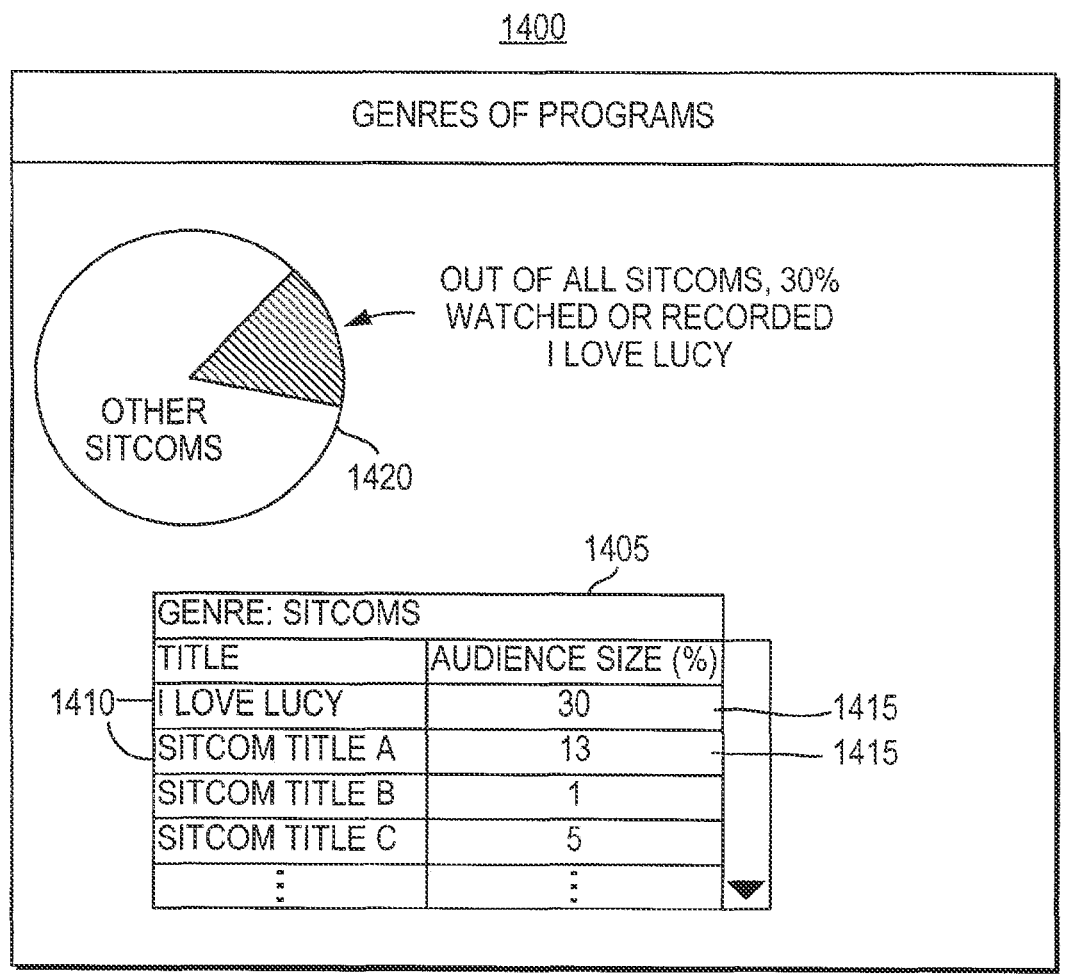
FIG. 14 is an illustrative display that may be displayed by the interactive television application for providing audience information for genres of programs, in accordance with one embodiment of the present invention.

"Genres of Programs" button 1015 may present the user with audience information of programs as compared to other media in the same category. For example, the user may view audience information for a sitcom and compare the audience information with audience information from other sitcoms. Upon the user selecting button 1015, the interactive television application may provide the user with illustrative display 1400 as shown in FIG. 14. Display 1400 includes list 1405 which may include titles 1410 and audience information 1415. List 1405 may be a drop-down menu, pop-up window, or any other list suitable for indicating sitcoms and providing their respective audience measurements. Audience information may be provided by overlaying graphic 1420. For example, graphic 1420 displays the number of users that watched or recorded "I Love Lucy" versus watching any other program in the sitcom category. Graphic 1420 may be a pie chart, graph, or any suitable content for providing audience measurements.

Figure 15:
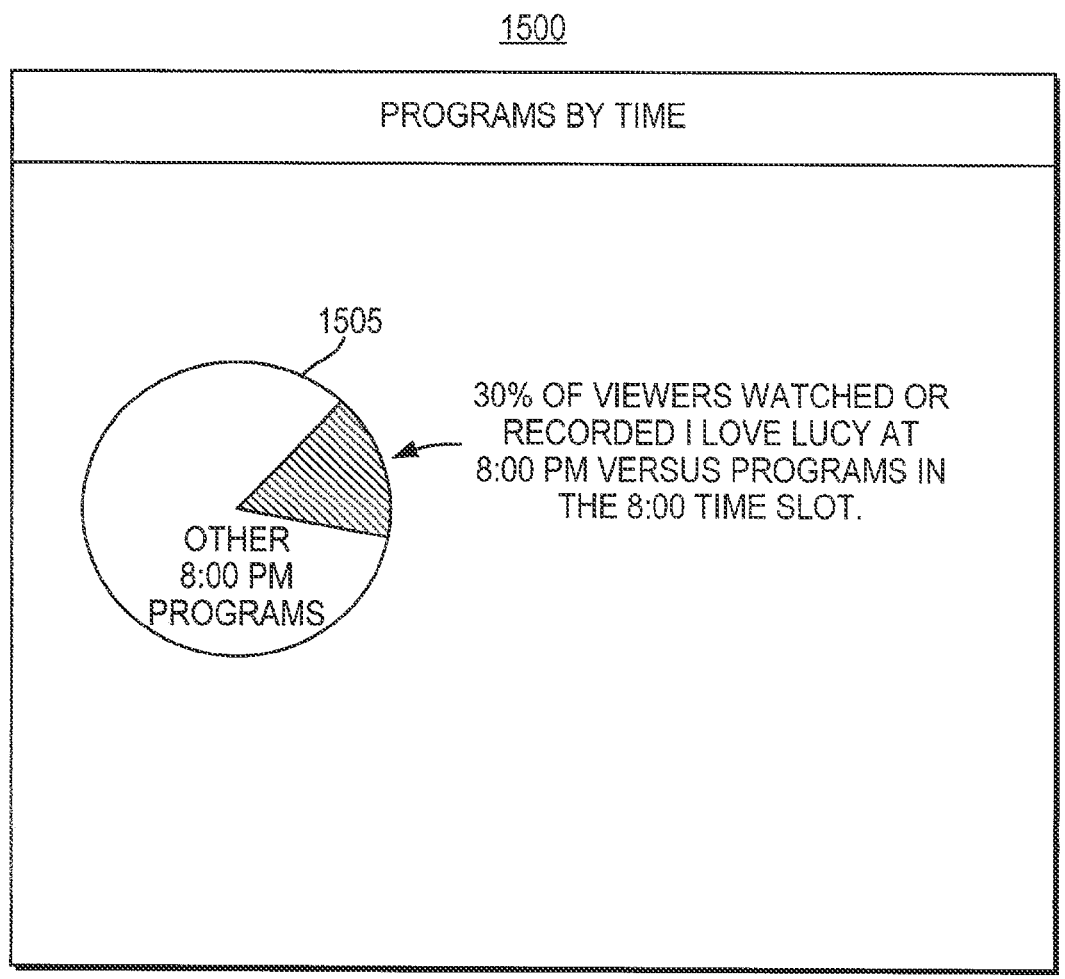
FIG. 15 is an illustrative display that may be displayed by the interactive television application for providing audience information for programs by time slot, in accordance with one embodiment of the present invention.

"Programs by Time" button 1030 may present the user with audience information of programs as compared to other media in the same time slot. For example, the user may compare audience information for a program showing at 8:00 PM and all other programs showing at 8:00 PM. Upon the user selecting button 1020, the interactive television application may present the user with illustrative display 1500 as shown in FIG. 15. Display 1500 includes audience information which may be provided by overlaying graphic 1505. As shown, graphic 1505 shows that 30 percent of users watched or recorded "I Love Lucy" at 8:00 PM versus watching other program in the 8:00 PM time slot. Graphic 1505 may be a pie chart, graph, or any suitable content for providing audience measurements.

Figure 16:
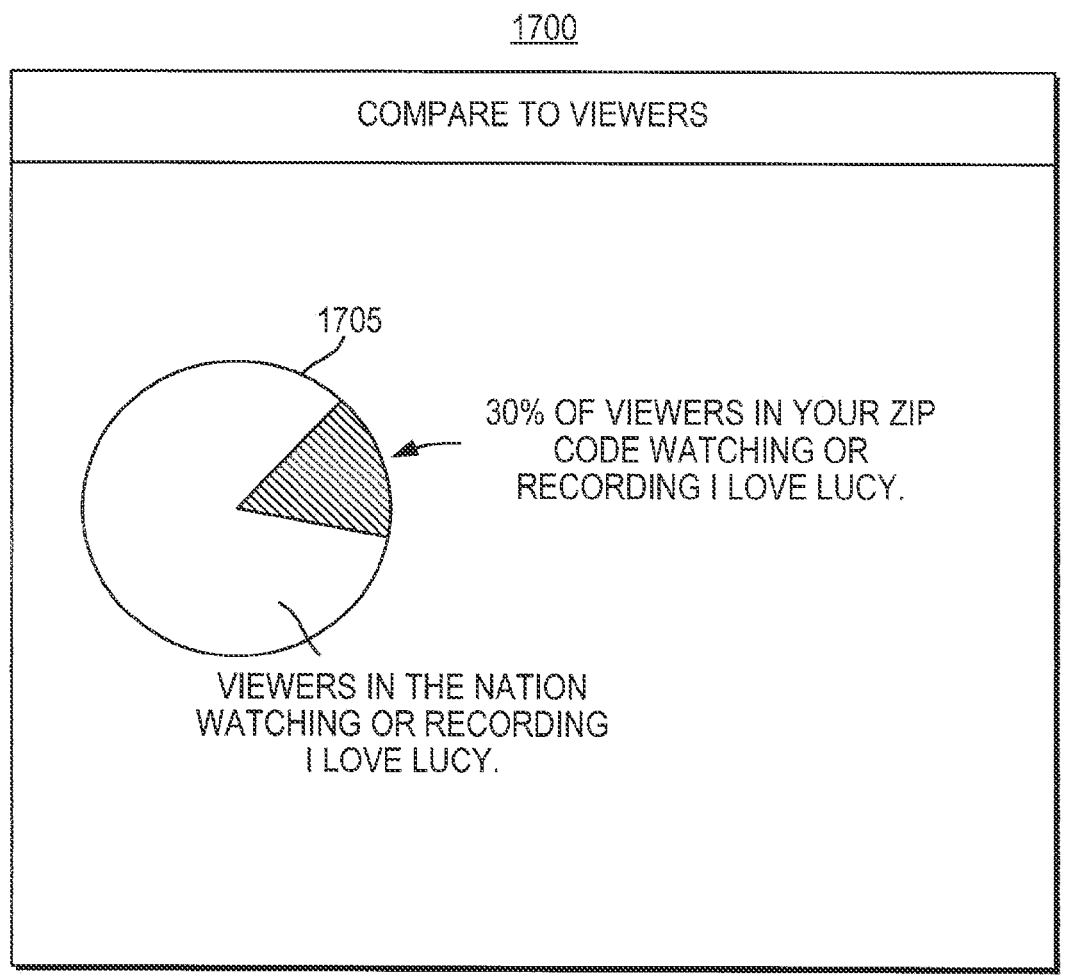
FIG. 16 is an illustrative display that may be displayed by the interactive television application for providing audience information based on the user, in accordance with one embodiment of the present invention.

Display 1000 may include "Compare to Viewers" button 1025. Selecting this button may allow the user to select a group of users for which to display audience information. This selection (not shown) may be used to modify any of the other displays, e.g., FIGS. 12-15. For example, illustrative display 1700 of FIG. 16 may be shown if the user selects audience information for viewers in the same zip code and selects "Programs by Time" button 1030. Display 1700 includes audience information which may be provided by overlaying graphic 1705. As shown, graphic 1705 shows that 30 percent of users is the user's zip code watched or recorded "I Love Lucy" compared to the users in the nation watching "I Love Lucy." Graphic 1705 may be a pie chart, graph, or any suitable content for providing audience measurements. In some embodiments, the user may be enabled to select national data (e.g., all users across the nation), regional data (e.g., all users in a user's geographical region), or market data (e.g., all users in a specific market/metro area). The user may be asked to enter location information, such as zip code, or the interactive application may know the location based on, for example, the location of the distribution facility. The user may select a demographic comparison, where the interactive application may compare the user to other users with similar demographics. The user may be asked to enter identifying information, information from user profiles may be used, demographic information may be based on monitoring the user's actions, or demographic information may be collected using any other suitable approach.

FIGS. 17-20 are flowcharts of steps involved in providing various features of embodiments of the present invention. In practice, one or more of the steps shown may be combined with other steps, performed in any suitable order, or deleted.

Figure 17:
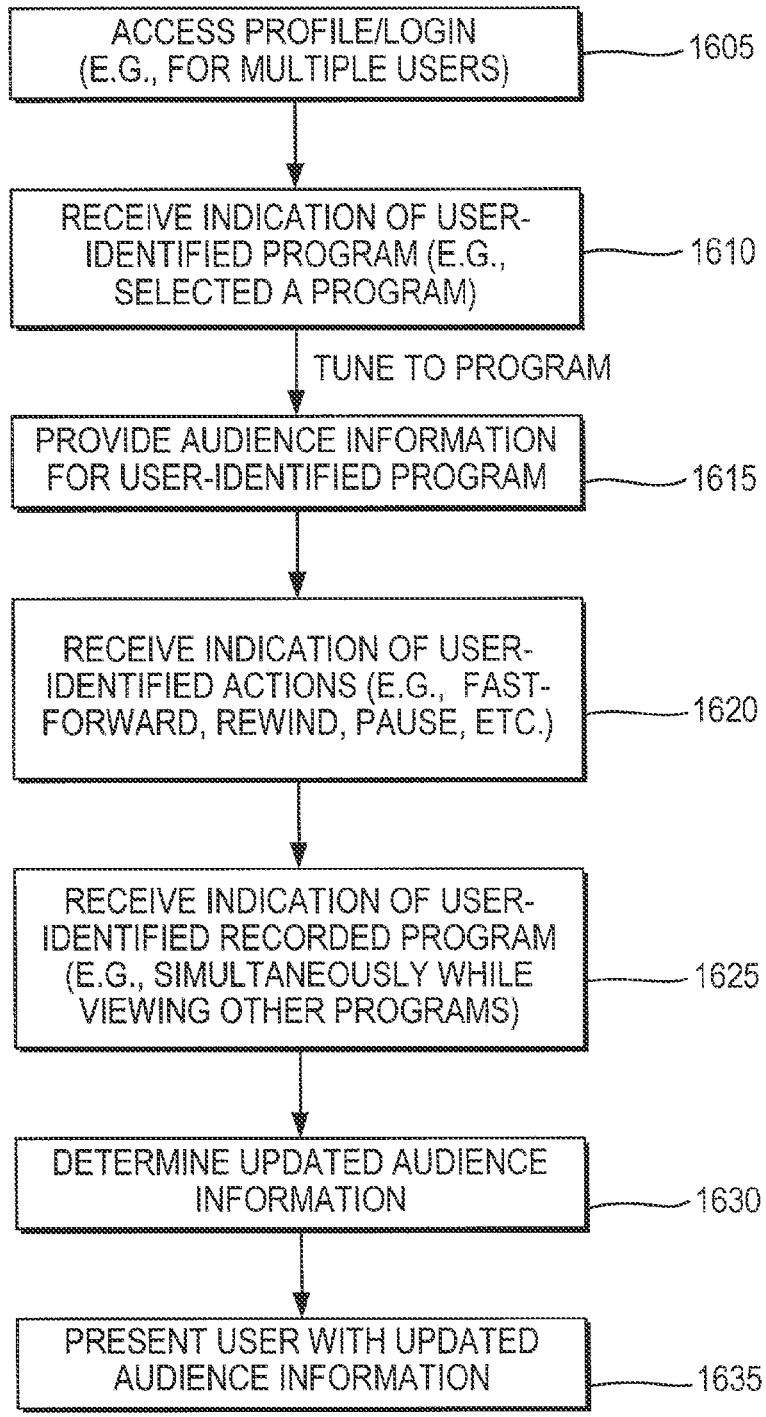
FIG. 17 is a flowchart of illustrative steps involved in providing the user with audience information based on tuning to a program or recording a program, in accordance with one embodiment of the present invention.

FIG. 17 is a flowchart of illustrative steps involved in providing audience information, in accordance with one embodiment of the present invention. The interactive television application may provide the user with access to the user's profile. At step 1605, an indication is received (e.g., by set-top box 260) that the user is accessing the user's profile. Profiles may be created and maintained to differentiate one user from another. For example, multiple users within one household may watch the same recorded program at different times. Accounting for multiple users may improve the granularity of audience information (as discussed later in FIG. 19). In some embodiments, the user may log in by, for example, entering a user name and a password. However, the user may not be required to log in. In approaches where the user logs in, the system may use the log in information to retrieve the user's information. User's information may include identification information (e.g., name), demographic information (e.g., age, gender, income, etc.), previous media selections, programs played back, interests, favorites, or any other suitable information.

At step 1610, indications of user-identified programs are received (e.g., by set-top box 260). Users may select programs by, for example, pressing buttons on the remote control or the set-top box. Selecting a program may include browsing through program listings. Program listings may include current programs, upcoming programs, recorded programs, or any other suitable media. Any other suitable approach may also be used. In response to the user's indication, the user may be provided with a program or any other media. When the user views the program or other media, audience information may be presented to the user at step 1615. Audience information may be provided with the media, such as with graphics and animations. However, audience information may also be provided separately from the media.

In another suitable approach, audience information may be provided with information about the program or any other media without providing the program itself (e.g., there may be no tune). For example, a user may be provided with a program listing. When the user selects a program from the listing, the interactive television application may provide the user with an information screen, as shown in FIG. 9. Audience information for upcoming programs may be based on the number of users that selected to view additional information about the program, the number of viewers that purchased the program in advance, the number of users that scheduled reminders, the number of users that scheduled to record the program, or any other suitable approach. The steps involved in providing audience information for upcoming programs are discussed below in FIG. 20.

In another suitable approach, audience information may be provided in the vertical blanking interval (VBI). Audience information may be provided using any other suitable approach and may be provided to the user using any suitable passive or interactive text, graphics, animations, video, audio, any combination thereof, or any other suitable content.

At step 1620, indications of user-identified actions are received. Actions may include the user pausing, rewinding, and fast-forwarding media. For example, with the introduction of personal video recorder (PVR) devices, users may pause, rewind, and fast-forward real-time programs. A user may pause a television program and resume watching the program thirty minutes later even while live television may be broadcasting another program (e.g., the next scheduled program). Upon the interactive television application executing the user-identified action, the user-identified action may be recorded, for example, by the set-top box, and accounted for when calculating audience information. User-identified actions may be used to more accurately access the audience information, such as audience share.

Figure 19:
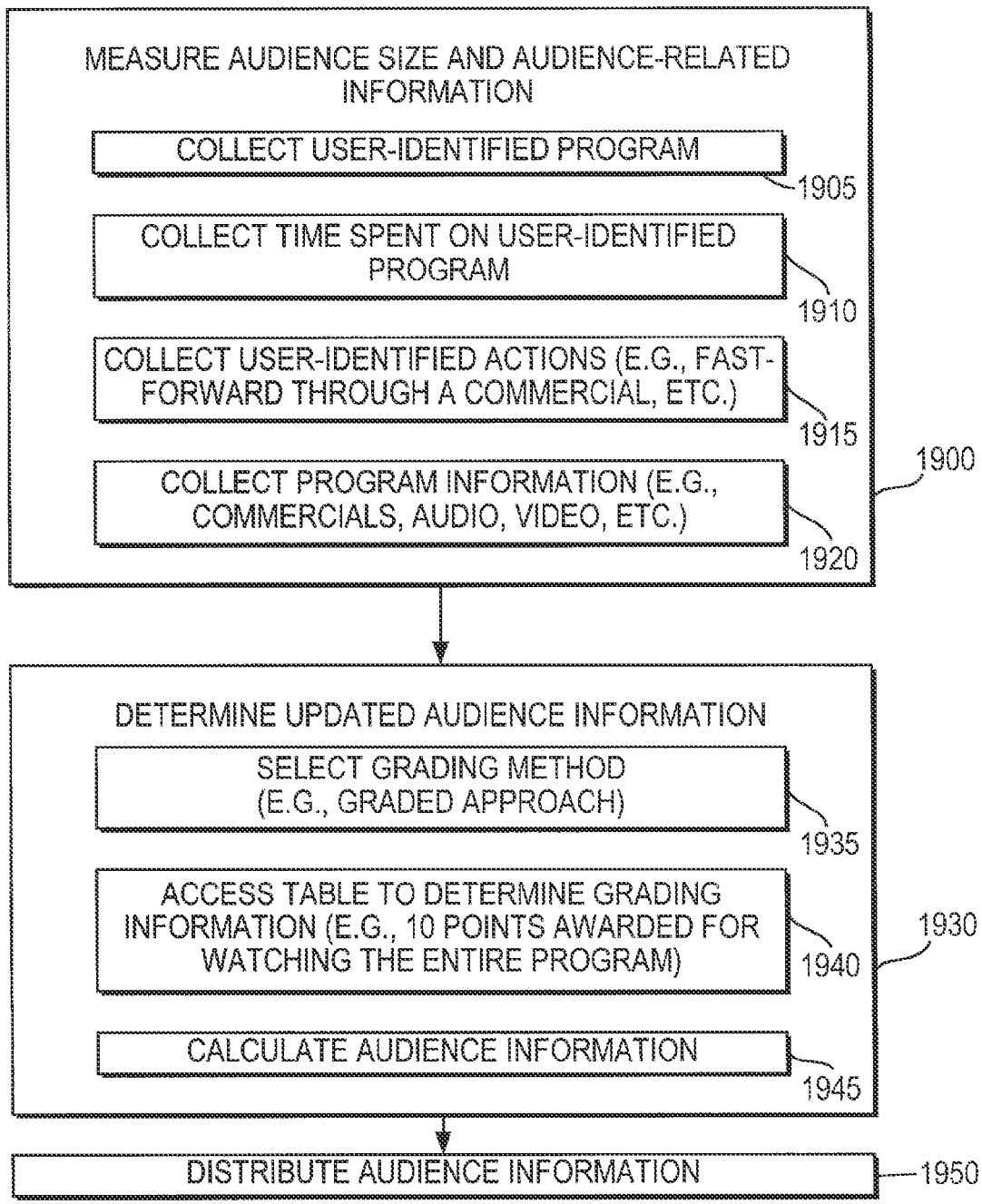
FIG. 19 is a flowchart of illustrative steps involved in determining and distributing audience information, in accordance with one embodiment of the present invention.

Some embodiments may allow users to watch or listen to programs while simultaneously recording other programs. At step 1625, indications of user-selected recorded programs are received (e.g., by set-top box 260). The program or other media is recorded along with program information and any other information that may be used in calculating audience information. For example, the information may be used when calculating the real-time audience of the program. After determining the updated audience information, the user may be presented with the updated audience information. Criteria for determining audience information is shown in FIG. 19 and will be discussed in further detail below. Audience information may be indicated to the user using any suitable approach, such as using the displays of FIGS. 5-16.

It is noted that although the user is shown as viewing and recording a program simultaneously, the user may view media, record media, or both.

Figure 18:
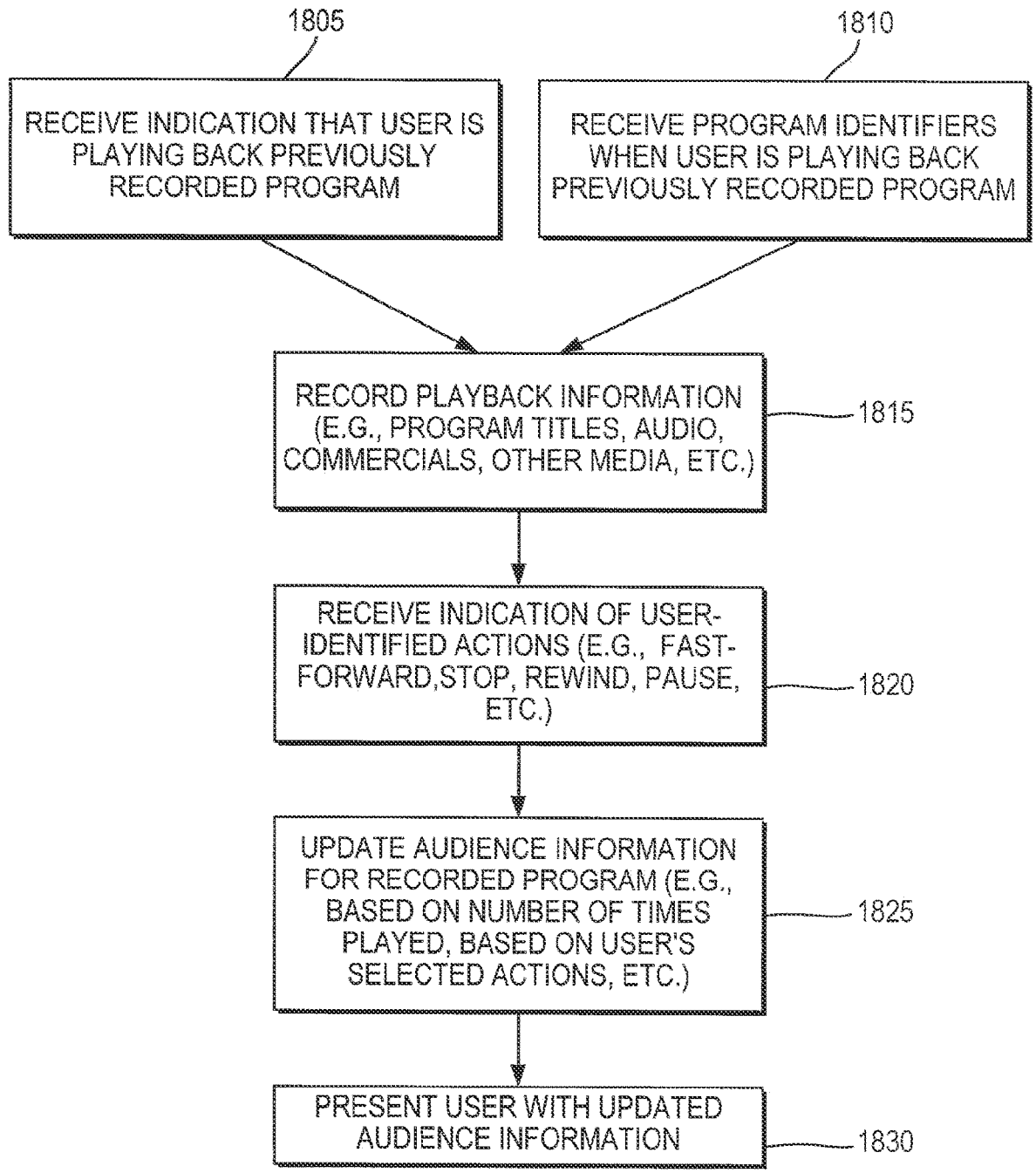
FIG. 18 is a flowchart of illustrative steps involved in providing the user with audience information based on playback information, in accordance with one embodiment of the present invention.

FIG. 18 is a flowchart of illustrative steps involved in providing audience information based on tracking user playbacks, in accordance with one embodiment of the present invention. At step 1805, indications that the user is playing back previously recorded media are received. Alternatively, at step 1810, identifiers, such as program identifiers, are received by, for example, the interactive television application indicating when the user is playing back previously recorded media. Identifiers may be used by, for example, the application (e.g., a program guide) during playback or recording to indicate to the distribution facility (e.g., via the main facility, cable headend, via user equipment, etc.) what media are being played back or recorded. Identifiers may be recorded with the program. For example, in PVR devices, program identifiers may be recorded as part of a digital data track. Program identifiers may also be stored by a guidance applications, such as the interactive television program guide. For example, program identifiers may be stored by the program guide when analog media is recorded. Program identifiers may be stored and provided using any other suitable approach. Any other suitable approach may be used for detecting playback.

At step 1815, playback information may be recorded (e.g., by the interactive application, by the set-top box, etc.). Playback information may include program titles, commercials, audio, or any other suitable media. The playback information may be provided at any suitable frequency (e.g., periodically, on-demand, in response to a query from the headend or main facility, etc.). Playback information may be used to aid in calculating the audience information for the media based on the number of times the media was played back.

At step 1820, indications of user-selected actions are received. Actions may include pausing, rewinding, fast-forwarding, and any other suitable action. For example, with the introduction of personal video recorder (PVR) devices, users may pause, rewind, and fast-forward programs. Upon providing the action to the user, the user's actions may be recorded, for example, by the set-top box or the application, and accounted for when calculating audience information. Audience information may be based on, for example, the user's selected actions, the number of times the previously recorded media was played back, etc.)

After updating audience information at step 1825, the interactive television application may present updated audience information to the user. Audience information may be presented to the user using any suitable approach, such as, for example, the approaches in the displays of FIGS. 5-16. The user may be presented with audience information at step 1830. Audience information may be real-time audience information.

FIG. 19 is a flowchart of illustrative steps involved in determining and distributing audience information, in accordance with one embodiment of the present invention. At step 1900, audience related-information may be measured and obtained. At substep 1905, information about the user-identified program (e.g., the program selected by the user) may be collected. The user-identified program may be determined during viewing, playback, recording, or at any other suitable time. At substep 1910, the time spent on the user-identified program may be determined. Any suitable processor or equipment (such as those with internal clocks or timing mechanisms) may, for example, be used to determine the amount of time the user spent watching the selected program. For example, indications that the user is playing a recorded program and when the user stops the recorded program are received by the set-top box.

At substep 1915, the user-identified actions may be collected. User-identified actions may include, for example, the user pressing the fast-forward key on the remote control fifteen minutes into the 8:00 PM viewing of "I Love Lucy." At substep 1920, program information may be collected. Program information may include commercials, audio, video, or any other media that may be presented during the user's selected program.

The user-identified program, user-identified actions, program information, and any other audience-related information may be, for example, stored in the set-top box and distributed to the main facility or any other suitable facility. Any other approach may also be used.

At step 1930, upon collecting and compiling the audience-related information (e.g., from set-top boxes, local information services, main facilities, etc.), audience information may be calculated. Audience information may be calculated using a predetermined algorithm. In some embodiments, a graded approach may be used to determine the audience information. For example, a first rating (e.g., a low rating) is assigned for the program when the program is recorded. Subsequently, a second rating (e.g., a higher rating) is assigned when the program is played back for the first time. Additional ratings may be assigned each time the program is played back. The use of the graded approach may enable, for example, the main facility or the headend to account for users that playback programs multiple times. Referring back to FIG. 17, the user logged in. By tracking and differentiating users, the same user watching the same program multiple times may be taken into account. Graded approaches or any other suitable approaches may be used to calculate the audience information. Grading methods, such as the graded approach, may be selected at step 1935. At step 1940, a table may be accessed to determine grading information. Grading information may be a point system. For example, in the graded approach described above the first playback is given a high rating. Upon determining the grading information and the grading method, the audience information is calculated at step 1945.

At step 1950, the audience information may be distributed to the user. For example, audience information may be distributed to the user's set-top box by main facility 120, audience detection equipment 155, interactive application equipment 130, any other distribution facility (e.g., cable system headend), or any other suitable facility. Audience information may also be distributed to other parties, such as ratings companies, advertisers, programmers, etc. Audience information may be distributed by any other suitable approach.

Figure 20:
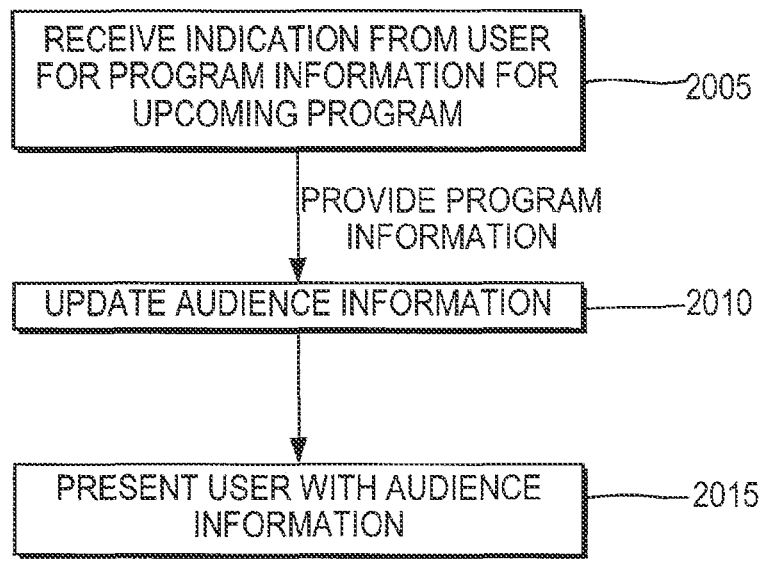
FIG. 20 is a flowchart of illustrative steps involved in providing the user with audience information for upcoming programs, in accordance with one embodiment of the present invention.

FIG. 20 is a flowchart of illustrative steps involved in providing audience information for upcoming programs, in accordance with one embodiment of the present invention. At step 2005, indications that the user is viewing program information about an upcoming program are received. For example, the user may click on a program title on a program listings display. The program listing may provide the user with information about upcoming programs on specific channels showing at a particular time. Upon receiving the indications from the user, the user may be provided with program information relating to the upcoming program.

At step 2010, the audience information may be updated. Audience information may be based on the number of users that selected to view additional program information about the upcoming program, the number of viewers that purchased the upcoming program in advance, the number of users that scheduled reminders for the upcoming program, the number of users that are scheduled to record the upcoming program, or any other suitable approach. The updated audience information may be presented to the user. Audience information may also be distributed to other parties, such as ratings companies, advertisers, programmers, etc. Audience information may be presented to the user using any suitable approach, such as, for example, the approaches in the displays of FIGS. 5-16. The user may be presented with the audience information at step 2015.

Thus, systems and methods for providing an interactive television application that more effectively measures audience size is provided. It will be understood that the foregoing is only illustrative of the principles of the invention and that various modifications can be made by those skilled in the art without departing from the scope and spirit of the invention, which is limited only by the claims that follow.

What is claimed is:

1. A method for providing popularity ratings of media content, the method comprising:
retrieving, using control circuitry, by way of the Internet, indications of user actions from a database, the user actions having been performed in relation to a program;
retrieving, from memory, grading information that indicates ratings to assign to the user actions to calculate a popularity for the program;
assigning a first rating to a first user action of the user actions based on the grading information and a type of the first user action, wherein the first user action is an action other than viewing the program;
assigning a second rating to a second user action of the user actions based on the grading information and a type of the second user action, wherein the second user action is an action to play back the program, and wherein the second rating is different than the first rating;
calculating an indication of popularity for the program by combining based on the first rating and the second rating;
generating for display a plurality of media asset identifiers, wherein the plurality of media asset identifiers includes an identifier for the program;
generating for display a graphical representation of the calculated indication of popularity of the program; and
determining whether the second user action is an action to play back the program for a first time or a second time,
wherein, in response to determining that the second user action is an action to play back the program for the first time, assigning the second rating to the second user action comprises assigning a high rating to the second user action, and
wherein, in response to determining that the second user action is an action to play back the program for the second time, assigning the second rating to the second users action comprises assigning a low rating to the second user action.

2. The method of claim 1, wherein the second user action is selected from a group comprising: fast-forward, rewind, stop, pause, record, play, viewing additional information about the upcoming media item, purchasing the upcoming media item in advance, setting a reminder for the upcoming media item, or scheduling to record the upcoming media item.

3. The method of claim 1, wherein the program is either a recorded program or an upcoming program.

4. The method of claim 1, wherein the indication of popularity for the program includes information about a user who performed the user actions.

5. The method of claim 4, wherein the information about the user who performed the user actions includes demographic information.

6. The method of claim 1, further comprising:
determining a group that includes a user who performed the user actions; and
filtering the user actions based on the group that includes the user who performed the user actions.

7. The method of claim 6, wherein calculating the indication of popularity for the program comprises calculating the indication of popularity for the program based on the filtered user actions.

8. The method of claim 1, wherein the indications of the user actions are received in real-time.

9. The method of claim 1, wherein the first user action is an action to record the program.

10. A system for providing popularity ratings of media content, the system comprising:
a memory; and
control circuitry configured to:
retrieve, by way of the Internet, indications of user actions from a database, the user actions having been performed in relation to a program;

retrieve, from the memory, grading information that indicates ratings to assign to user actions to calculate a popularity for the program;

assign a first rating to a first user action of the user actions based on a type of the first user action and the grading information, wherein the first user action is an action other than viewing the program;

assign a second rating to a second user action of the user actions based on a type of the second user action and the grading information, wherein the second user action is an action to play back the program, and wherein the second rating is different than the first rating;

calculate an indication of popularity for the program by combining the first rating and the second rating;

generate for display a plurality of media asset identifiers, wherein the plurality of media asset identifiers includes an identifier for the program;

generate for display a graphical representation of the calculated indication of popularity of the program; and determine whether the second user action is an action to play back the program for a first time or a second time, wherein, in response to determining that the second user action is an action to play back the program for the first time, the control circuitry is configured to assign the second rating to the second user action by assigning a high rating to the second user action, and wherein, in response to determining that the second user action is an action to play back the program for the second time, the control circuitry is configured to assign the second rating to the second user action by assigning a low rating to the second user action.

11. The system of claim 10, wherein the second user action is selected from a group comprising: fast-forward, rewind, stop, pause, record, play, viewing additional information about the upcoming media item, purchasing the upcoming media item in advance, setting a reminder for the upcoming media item, or scheduling to record the upcoming media item.

12. The system of claim 10, wherein the program is either a recorded program or an upcoming program.

13. The system of claim 10, wherein the indication of popularity for the program includes information about a user who performed the user actions.

14. The system of claim 13, wherein the information about the user who performed the user actions includes demographic information.

15. The system of claim 10, wherein the control circuitry is further configured to:
determine a group that includes a user who performed the user actions; and
filter the user actions based on the group that includes the user who performed the user actions.

16. The system of claim 15, wherein the control circuitry is configured to calculate the indication of popularity for the program by calculating the indication of popularity for the program based on the filtered user actions.

17. The system of claim 10, wherein the indications of the user actions are received in real-time.

18. The system of claim 10, wherein the first user action is an action to record the program.

* * * * *